United States Patent
Bagnariol et al.

(10) Patent No.: US 9,440,504 B2
(45) Date of Patent: Sep. 13, 2016

(54) TWO-WHEELED VEHICLE

(71) Applicant: Polaris Industries Inc., Medina, MN (US)

(72) Inventors: David L. Bagnariol, Shafer, MN (US); Stephen J. Kemp, Eagan, MN (US); G. Jay McKoskey, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/213,161

(22) Filed: Mar. 14, 2014

(65) Prior Publication Data

US 2014/0262580 A1    Sep. 18, 2014

Related U.S. Application Data

(60) Provisional application No. 61/799,880, filed on Mar. 15, 2013.

(51) Int. Cl.
*F02M 35/02* (2006.01)
*B60G 7/00* (2006.01)
(Continued)

(52) U.S. Cl.
CPC .............. *B60G 7/006* (2013.01); *B60K 11/04* (2013.01); *B60K 13/02* (2013.01); *B60K 13/06* (2013.01); *B60K 15/067* (2013.01); *B62J 15/02* (2013.01); *B62J 35/00* (2013.01); *B62K 11/02* (2013.01); *B62K 11/04* (2013.01); *B62K 19/24* (2013.01); *B62K 19/32* (2013.01); *B62K 25/283* (2013.01); *B62M 7/04* (2013.01); *F02M 35/0204* (2013.01); *F02M 35/02491* (2013.01);

(Continued)

(58) Field of Classification Search
CPC ..... F02M 35/02; F02M 35/10; F02M 35/162
USPC ........................................................ 180/219
See application file for complete search history.

(56) References Cited

U.S. PATENT DOCUMENTS 4,019,595 A   4/1977 Imai et al.
4,066,142 A   1/1978 Hooper
(Continued)

FOREIGN PATENT DOCUMENTS

EP    1515037 A1    3/2005
EP    1602568 A2    12/2005
(Continued)

OTHER PUBLICATIONS

International Search Report and Written Opinion of the International Searching Authority issued by the European Patent Office, dated as of the International Search Report, Aug. 5, 2014, for International Application No. PCT/US2014/028539; 34 pages.
(Continued)

*Primary Examiner* — Kevin Hurley
*Assistant Examiner* — Michael Stabley
(74) *Attorney, Agent, or Firm* — Faegre Baker Daniels LLP

(57) ABSTRACT

A two-wheeled vehicle includes a frame having a front frame portion, a mid-frame portion, and a rear frame portion. The mid-frame portion is coupled to the rear frame portion and the front frame portion. The vehicle further includes a plurality of ground-engaging members for supporting the frame. The front frame portion is removably coupled to the mid-frame portion with a plurality of frame members extending between the front frame portion and the mid-frame portion.

22 Claims, 38 Drawing Sheets

(51) Int. Cl.
| | |
|---|---|
| *B60K 11/04* | (2006.01) |
| *B60K 13/02* | (2006.01) |
| *B60K 15/067* | (2006.01) |
| *B62K 11/02* | (2006.01) |
| *B60K 13/06* | (2006.01) |
| *B62K 25/28* | (2006.01) |
| *B62M 7/04* | (2006.01) |
| *B62J 15/02* | (2006.01) |
| *B62J 35/00* | (2006.01) |
| *B62K 11/04* | (2006.01) |
| *B62K 19/24* | (2006.01) |
| *B62K 19/32* | (2006.01) |
| *F02M 35/16* | (2006.01) |
| *F02M 37/10* | (2006.01) |
| *F02M 35/024* | (2006.01) |
| *F02M 35/04* | (2006.01) |
| *F02B 61/02* | (2006.01) |
| *B62K 15/00* | (2006.01) |

(52) U.S. Cl.
CPC ........ *F02M 35/048* (2013.01); *F02M 35/162* (2013.01); *F02M 37/103* (2013.01); *B62K 2015/001* (2013.01); *F02B 61/02* (2013.01); *Y10T 29/49826* (2015.01)

(56) References Cited

U.S. PATENT DOCUMENTS

| | | | | |
|---|---|---|---|---|
| 4,484,651 | A | * | 11/1984 | Hattori et al. ............... 180/225 |
| 4,597,466 | A | * | 7/1986 | Yamada ...................... 180/225 |
| 4,799,569 | A | * | 1/1989 | Hattori et al. ............... 180/219 |
| 4,852,678 | A | * | 8/1989 | Yamaguchi ................. 180/219 |
| 5,248,012 | A | * | 9/1993 | Kurawaki et al. .......... 180/219 |
| 5,284,221 | A | * | 2/1994 | Warne ........................ 180/219 |
| 6,189,638 | B1 | | 2/2001 | Ito et al. |
| 6,315,071 | B1 | | 11/2001 | Gogo |
| 6,450,282 | B1 | | 9/2002 | Gogo et al. |
| 7,264,072 | B2 | * | 9/2007 | Yoshikawa et al. ......... 180/68.3 |
| 7,380,624 | B2 | * | 6/2008 | Momosaki ................... 180/68.3 |
| 7,658,395 | B2 | | 2/2010 | Bagnariol et al. |
| 7,669,682 | B2 | * | 3/2010 | Holroyd et al. ............. 180/227 |
| 7,690,668 | B2 | | 4/2010 | Holroyd et al. |
| 7,748,746 | B2 | * | 7/2010 | Beiber Hoeve et al. .... 280/835 |
| 7,762,367 | B2 | | 7/2010 | Yamaguchi et al. |
| 7,779,950 | B2 | * | 8/2010 | Hoeve et al. ................ 180/219 |
| 7,832,516 | B2 | * | 11/2010 | Bagnariol .................... 180/219 |
| 7,883,136 | B2 | | 2/2011 | Tomolillo et al. |
| 7,942,226 | B2 | * | 5/2011 | Nishizawa ............ B62K 11/04 180/219 |
| 7,987,936 | B2 | * | 8/2011 | Yamakura ............... F01P 11/10 137/354 |
| 8,105,406 | B2 | * | 1/2012 | Nishizawa ......... B01D 46/0005 123/198 E |
| 8,146,693 | B2 | * | 4/2012 | Oohashi ................. B60K 13/02 180/68.3 |
| 2003/0075659 | A1 | | 4/2003 | Fukunaga et al. |
| 2004/0050357 | A1 | | 3/2004 | Idei et al. |
| 2005/0006162 | A1 | | 1/2005 | Philipps et al. |
| 2006/0290097 | A1 | | 12/2006 | Kawamura et al. |
| 2008/0006458 | A1 | | 1/2008 | Yamaguchi et al. |
| 2009/0013953 | A1 | | 1/2009 | Fujita et al. |
| 2009/0194351 | A1 | | 8/2009 | Murasawa et al. |
| 2010/0187033 | A1 | | 7/2010 | Hayashi et al. |
| 2010/0193275 | A1 | | 8/2010 | Song et al. |

FOREIGN PATENT DOCUMENTS

| | | |
|---|---|---|
| EP | 1790561 A1 | 5/2007 |
| EP | 2206911 A1 | 7/2010 |
| GB | 555975 A | 9/1943 |
| GB | 1486654 A | 9/1977 |
| JP | S 5277160 U | 6/1977 |
| JP | S 61176092 U | 11/1986 |
| JP | S 6228692 U | 2/1987 |
| JP | S 6345390 U | 3/1988 |
| JP | S 6371490 A | 3/1988 |
| JP | S 6358089 U | 4/1988 |
| JP | S 63240485 A | 10/1988 |
| JP | H 0295997 A | 4/1990 |
| JP | H 02162180 A | 6/1990 |
| JP | H 0345485 A | 2/1991 |
| JP | H 0455185 A | 2/1992 |
| JP | H 0455187 A | 2/1992 |
| JP | H 0585448 A | 4/1993 |
| JP | H 0687481 A | 3/1994 |
| JP | H 07279663 A | 10/1995 |
| JP | H 10194178 A | 7/1998 |
| JP | H 10236365 A | 9/1998 |
| JP | 2000062671 A | 2/2000 |
| JP | 2003127953 A | 5/2003 |
| JP | 2005047403 A | 2/2005 |
| JP | 2006240345 A | 9/2006 |
| WO | WO 00/35743 A2 | 6/2000 |
| WO | WO 2008/088809 A2 | 7/2008 |
| WO | WO 2014/075091 A2 | 5/2014 |

OTHER PUBLICATIONS

Photograph of Honda motorcycle, 1 page, available at least as early as Jan. 22, 2013, at http://motoprofi.com/imgs/a/a/a/w/d/honda_cx_500_c_1982_3_1gw.jpg.

International Preliminary Report on Patentability issued by the European Patent Office, dated Aug. 12, 2015, for International Application No. PCT/US2014/028539; 44 pgs.

* cited by examiner

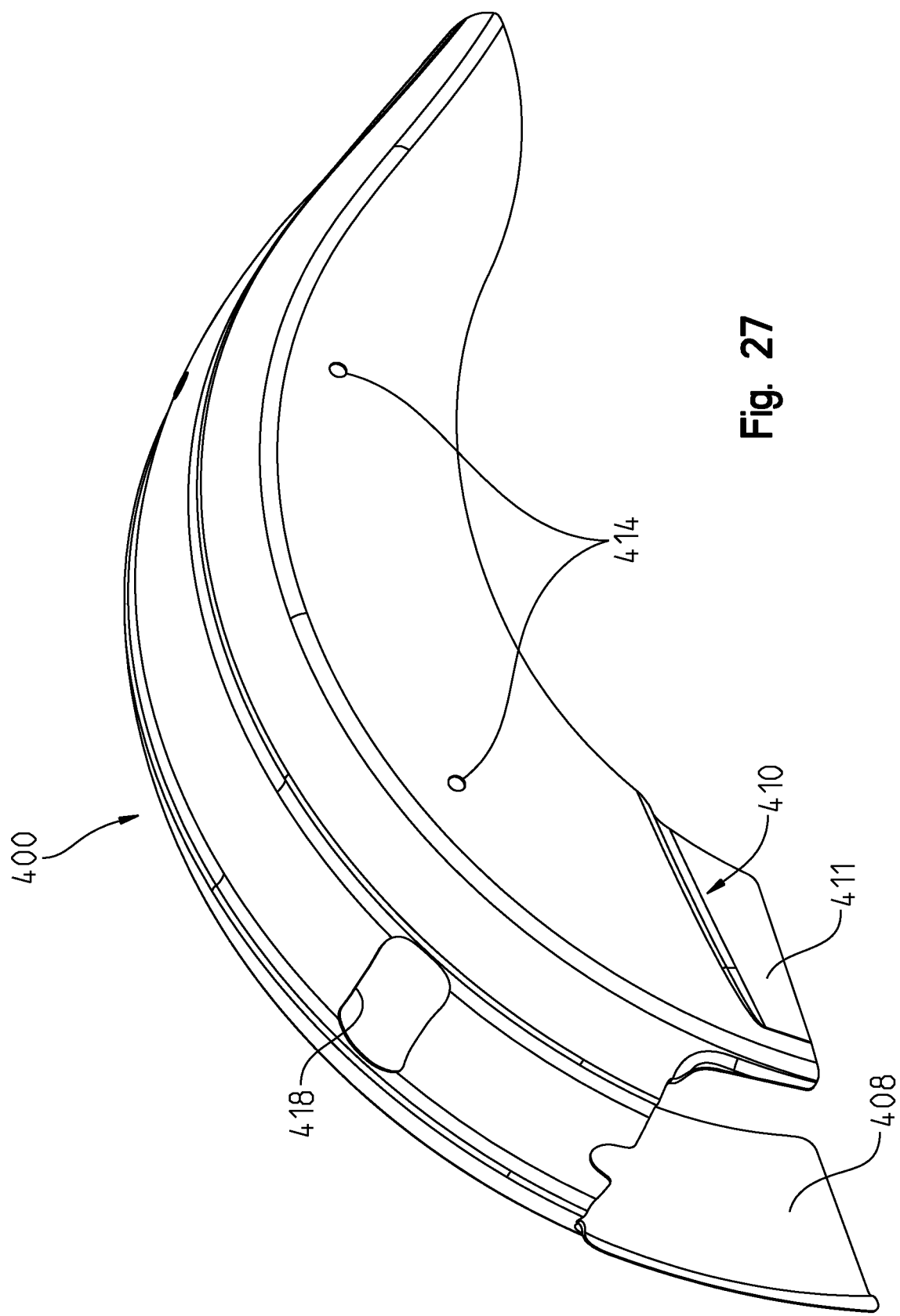

TWO-WHEELED VEHICLE

CROSS-REFERENCE TO RELATED APPLICATIONS

The present application claims priority to U.S. Provisional Patent Application Ser. No. 61/799,880, filed on Mar. 15, 2013, and entitled "TWO-WHEELED VEHICLE," the complete disclosure of which is expressly incorporated by reference herein.

BACKGROUND OF THE DISCLOSURE

The present disclosure relates to two-wheeled vehicles and, more particularly, to motorcycles having a modular frame.

Conventional two-wheeled vehicles include a frame for supporting an operator. The frame may also support a passenger rearward of the driver. An engine is typically positioned below the driver and is coupled to the frame. The front of the vehicle may include a panel or cover positioned forward of the driver for supporting additional components of the vehicle, for example a light. The rear of the vehicle may include a cargo area, for example saddle bags extending laterally outward from the frame.

SUMMARY OF THE DISCLOSURE

In an exemplary embodiment of the present invention, a two-wheeled vehicle comprises a frame assembly including a front frame portion including a head portion, a plurality of generally vertically-extending frame tubes, and a plurality of generally longitudinally-extending frame tubes. The frame assembly further includes a mid-frame portion removably coupled to the front frame portion and a rear frame portion removably coupled to the mid-frame portion. The two-wheeled vehicle further comprises a plurality of ground-engaging members for supporting the frame assembly and an air intake assembly coupled to the head portion and the longitudinally-extending frame tubes. The longitudinally-extending frame tubes are angled outwardly to increase a distance therebetween. The air intake assembly is positioned between the longitudinally-extending frame tubes and includes channel members configured to receive the longitudinally-extending frame tubes.

In a further exemplary embodiment of the present invention, a two-wheeled vehicle comprises a frame assembly including a front frame portion including a head portion, a plurality of generally vertically-extending frame tubes, and a plurality of generally longitudinally-extending frame tubes. The frame assembly also includes a mid-frame portion removably coupled to the front frame portion and a rear frame portion removably coupled to the mid-frame portion. The two-wheeled vehicle further comprises a plurality of ground-engaging members for supporting the frame assembly and an air intake assembly coupled to the head portion. The air intake assembly includes a filter and a first portion of air received into the air intake assembly is directed from the filter of the air intake assembly into the head portion of the front frame portion. Additionally, the two-wheeled vehicle comprises a throttle body coupled to the air intake assembly and a second portion of the air received into the air intake assembly flow directly from the filter into the throttle body.

In another exemplary embodiment of the present invention, a two-wheeled vehicle comprises a frame assembly including a front frame portion including a head portion, a plurality of generally vertically-extending frame tubes, and a plurality of generally longitudinally-extending frame tubes. The frame assembly also includes a mid-frame portion removably coupled to the front frame portion and a rear frame portion removably coupled to the mid-frame portion. The two-wheeled vehicle further comprises a plurality of ground-engaging members for supporting the frame assembly and a cooling assembly positioned below the head portion and intermediate the vertically-extending frame tubes. A lower end of the cooling assembly is coupled to a lower end of the vertically-extending frame tubes, and an upper end of the cooling assembly is frictionally retained at an upper end of each of the vertically-extending frame tubes.

In a further exemplary embodiment of the present invention, a two-wheeled vehicle comprises a frame assembly including a front frame portion including a head portion, a plurality of generally vertically-extending frame tubes, and a plurality of generally longitudinally-extending frame tubes. The frame assembly also includes a mid-frame portion removably coupled to the front frame portion and a rear frame portion removably coupled to the mid-frame portion. The two-wheeled vehicle further comprises a front ground-engaging member for supporting the frame assembly and a rear ground-engaging member for supporting the frame assembly. Additionally, the two-wheeled vehicle comprises a rear suspension assembly operably coupled to the rear ground-engaging member. The rear suspension assembly includes a first swing arm coupled to the mid-frame portion, a second swing arm coupled to the mid-frame portion, and a pivot axle extending between the first and second swing arms. Rotation of the pivot axle is configured to adjust the position of the mid-frame portion relative to the first and second swing arms.

In another exemplary embodiment of the present invention, a two-wheeled vehicle comprises a frame assembly including a front frame portion including a head portion, a plurality of generally vertically-extending frame tubes, a plurality of generally longitudinally-extending frame tubes, and a plurality of plate members coupled to the longitudinally-extending frame tubes and extending downwardly therefrom. The frame assembly also includes a mid-frame portion removably coupled to the front frame portion and a rear frame portion removably coupled to the mid-frame portion. The two-wheeled vehicle further comprises a plurality of ground-engaging members for supporting the frame assembly and a fuel tank coupled to the plate members. An upper end of the plate members is permanently coupled to the longitudinally-extending frame tubes and a lower end of the plate members is coupled to the head portion.

In a further exemplary embodiment of the present invention, a method for assembling a two-wheeled vehicle comprises the steps of providing a modular front frame portion, providing a modular mid-frame portion, and coupling the mid-frame portion to the front frame portion. Additionally, the method comprises the steps of providing a modular rear frame portion and coupling the rear frame portion to the mid-frame portion. The method also comprises the steps of providing a plurality of vehicle components selected from the group consisting of handlebars, wheels, an exhaust assembly, a seat, a fuel tank, a front fender, a rear fender, and a swing arm assembly, and coupling the vehicle components to at least one of the front frame portion, the mid-frame portion, and the rear frame portion. Each of the vehicle components has a plurality of sizes, shapes, and styles, and the modular frame portions are configured to accommodate the various sizes, shapes, and styles of each of the vehicle components.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 27 is a left front perspective view of a rear fender of the rear portion of the two-wheeled vehicle;

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a cruise motorcycle, it should be understood, that the invention may have application to other types of vehicles such as all-terrain vehicles, motorcycles, watercraft, utility vehicles, scooters, golf carts, and mopeds.

Figure 17:
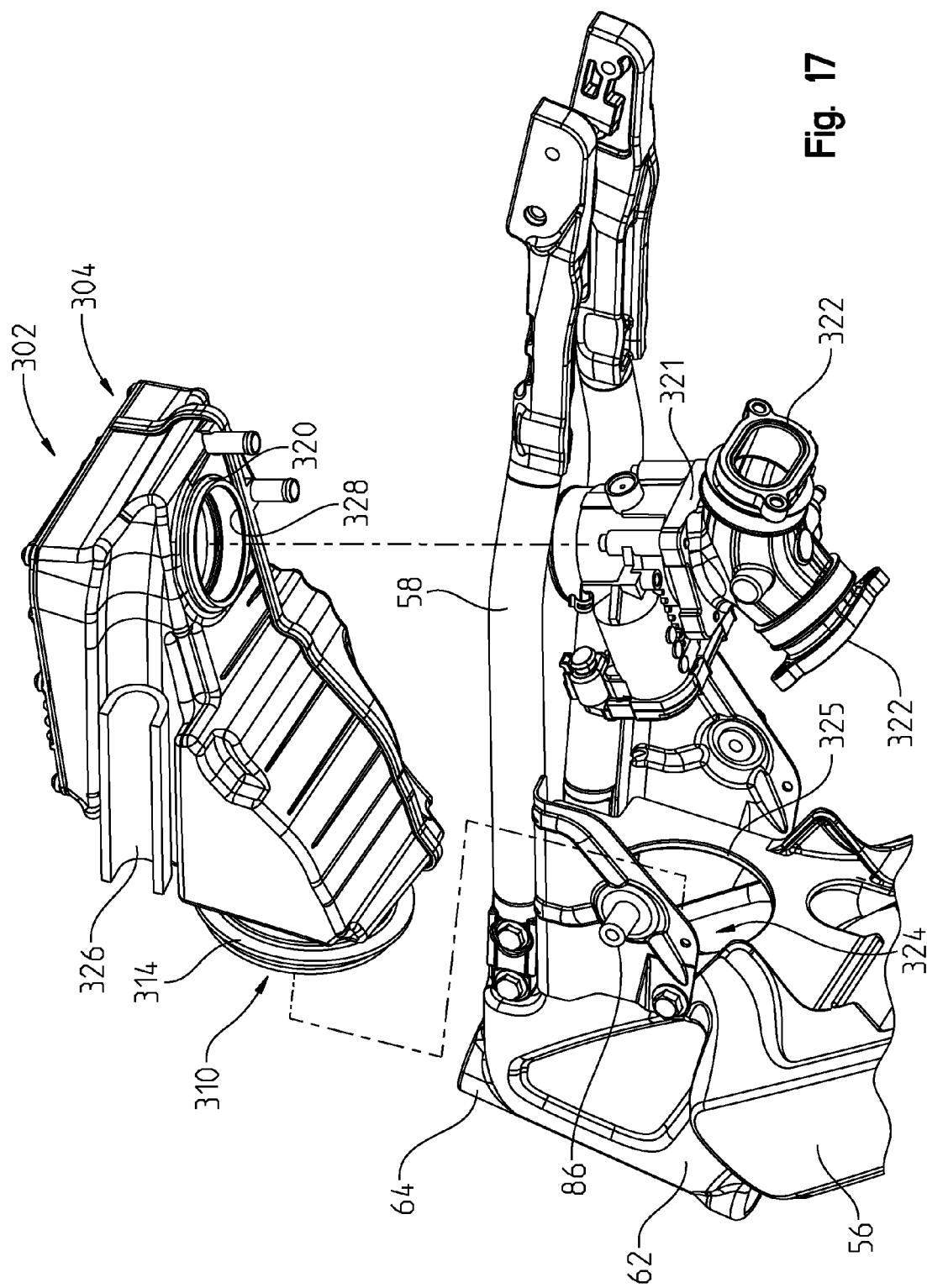
FIG. 17 is an exploded view of the air intake assembly and the front frame of FIG. 16.
Figure 18:
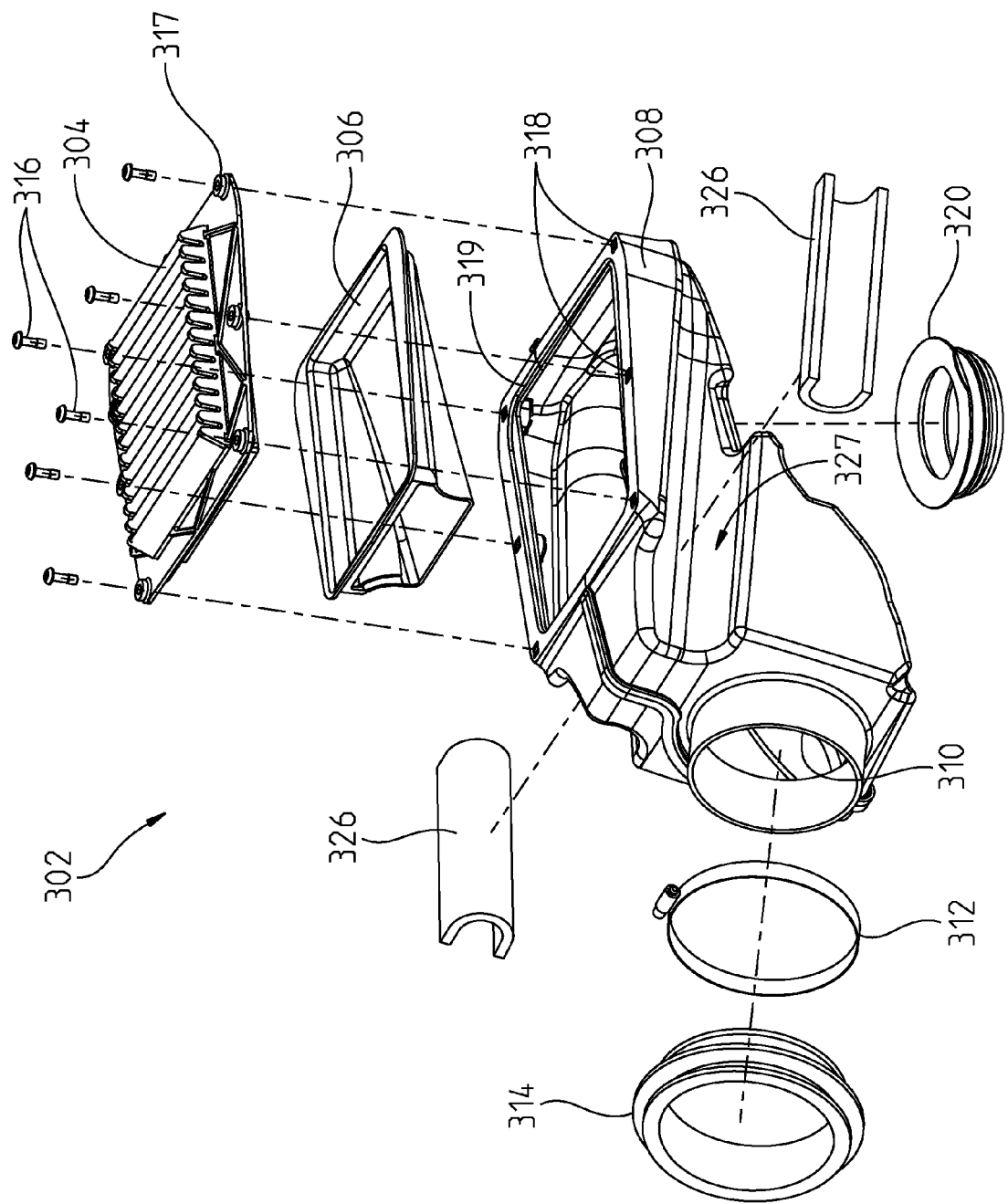
FIG. 18 is an exploded view of an air box of the air intake assembly of FIG. 16.

An illustrative embodiment of a two-wheeled vehicle 2 is shown. Vehicle 2 is a mid-size motorcycle having a wheel base of approximately 58-65 inches and, more particularly, is approximately 61.5 inches. Vehicle 2 includes a front end and a rear end supported by a plurality of ground-engaging members, for example a front wheel and a rear wheel. The front and rear wheels are generally aligned along a centerline of vehicle 2. While vehicle 2 is a two-wheeled vehicle, various embodiments of the present disclosure may include three, four, five, or six-wheeled vehicles. A front fender may be partially positioned around the front wheel and may include a light or reflector. Similarly, a rear fender 400 may be partially positioned around the rear wheel. Additionally, a brake assembly 12 is operably coupled to the front and rear wheels. Brake assembly 12 includes brake discs and may further include an anti-locking braking module 160 (FIGS. 17 and 18).

Vehicle 2 also includes a front suspension assembly, a steering assembly 24, operator controls 26, and other systems. Steering assembly 24 includes handlebars 30 which may be moved by an operator to rotate the front wheel. Steering assembly 24 is coupled to vehicle 2 through a triple clamp assembly 32.

Vehicle 2 also includes a frame assembly 50 for supporting a powertrain assembly 130, a cooling assembly 240, a fuel tank 300, a rear suspension assembly 380, and an operator seat 28. Referring now to FIGS. 1-4, frame assembly 50 is a modular assembly that includes a front frame 52, a mid-frame 53, and a rear frame 54. Because frame assembly 50 is modular, various components of vehicle 2, such as an air intake assembly 300, an exhaust assembly 360, cooling assembly 240, operator controls 26, steering assembly 24, seat 28, front suspension assembly 20, and rear suspension assembly 380, may be replaced with alternative embodiments without reconfiguring frame assembly 50 to support these alternative embodiments. Additionally, front frame 52, mid-frame 53, and rear frame 54 are generally coupled together and coupled with other components of vehicle 2 without requiring heat treatments or permanent couplers (i.e., welds). As such, various components of vehicle 2 may be replaced with alternative components without requiring a new frame assembly.

Front frame 52 is positioned forward of mid-frame 53 and rear frame 54 and includes down tubes or front arm members 56 and frame rails 58. Mid-frame 53 includes side members 60 and is coupled to both front frame 52 and rear frame 54. As detailed further herein, mid-frame 53 is bolted to front frame 52 and rear frame 54, which eliminates the need for heat treating and permanently coupling together the portions of frame assembly 50.

Front arm members 56 of front frame 52 extend downwardly from a head portion 62. Additionally, front arm members 56 may be angled rearwardly relative to head portion 62. The lower ends of front arm members 56 include a plurality of apertures 68, 70 for coupling with powertrain assembly 130. Front arm members 56 cooperate with head portion 62 to form a pocket 66, as detailed further herein.

Head portion 62 includes a head tube 64 for coupling with steering assembly 24. Head portion 62 also includes a plurality of apertures 72 (FIG. 3) for coupling with frame rails 58, as detailed further herein. Apertures 72 are located within recesses 71 of head portion 62. Front arm members 56, head portion 62, and head tube 64 may be a single uniform component formed through casting methods. Alternatively, each front arm member 56 may be integrally formed with approximately half of head 62 and approximately half of head tube 64. These opposing sides may be coupled to each other with conventional fasteners (e.g., bolts, rivets, welds, and/or adhesive). Illustratively, front arm members 56, head 62, and head tube 64 may be comprised of metallic materials, for example an aluminum or chrome moly material. It may be appreciated that the uniform construction of front arm members 56, head portion 62, and head tube 64 eliminates the need for heat treating front frame 52.

Frame rails 58 extend rearwardly from head portion 62 and define a backbone of vehicle 2. Frame rails 58 may be comprised of steel and allow front frame 52 to be adjusted for stiffness and yet are sufficiently flexible to accommodate various tolerances and forces in frame assembly 50 during assembly. More particularly, frame rails 58 allow powertrain assembly 130 to be coupled to frame assembly 50 without pre-stressing frame assembly 50. Additionally, because of the use of frame rails 58, spacers and other adjusters may not be needed when assembling various components of vehicle 2 with frame assembly 50. The forward ends of frame rails 58 include front couplers 78. Front couplers 78 may be cast portions welded to frame rails 58. Alternatively, front couplers 78 may be coupled to frame rails 58 with fasteners (e.g., bolts, rivets). As shown best in FIG. 4, front couplers 78 may partially extend into frame rails 58 when coupled thereto.

Figure 4:
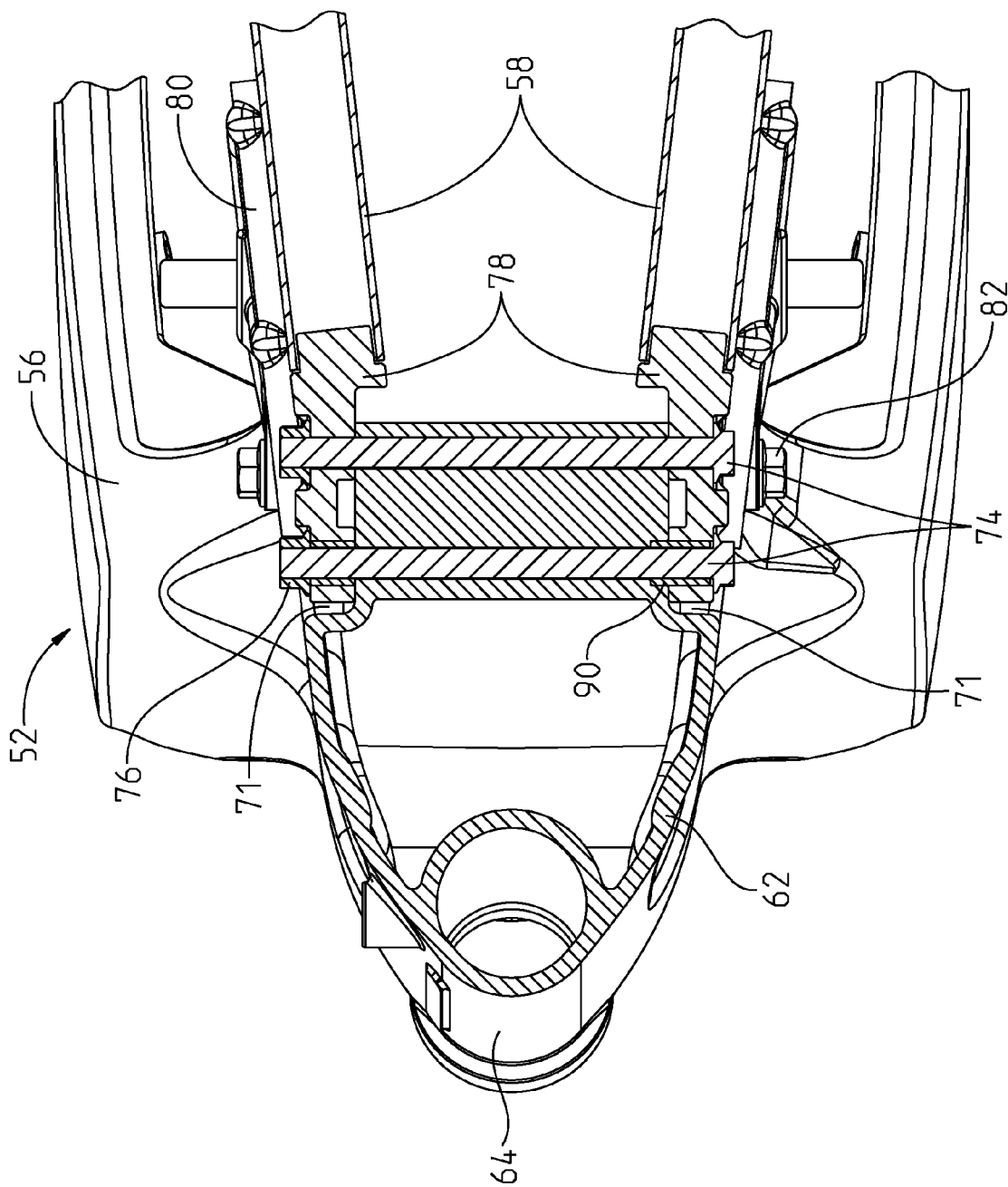
FIG. 4 is a cross-sectional view of a portion of the frame assembly of FIG. 1, taken along line 4-4 of FIG. 1.

Frame rails 58 also may include plates 80 extending downwardly therefrom. Plates 80 may increase the strength and stiffness of front frame 52. Illustratively, as shown in FIG. 4, plates 80 extend outwardly from frame rails 58. Plates 80 include a post 86 and isolators 88 (FIG. 5), as further detailed herein. Plates 80 are coupled to a portion of frame rails 58 and a portion of front couplers 78. For example, plates 80 may be integrally coupled to frame rails 58 and front couplers 78 through welding. Alternatively, plates 80 may be coupled to frame rails 58 and front couplers 78 with mechanical fasteners (e.g., bolts, rivets).

Figure 1:
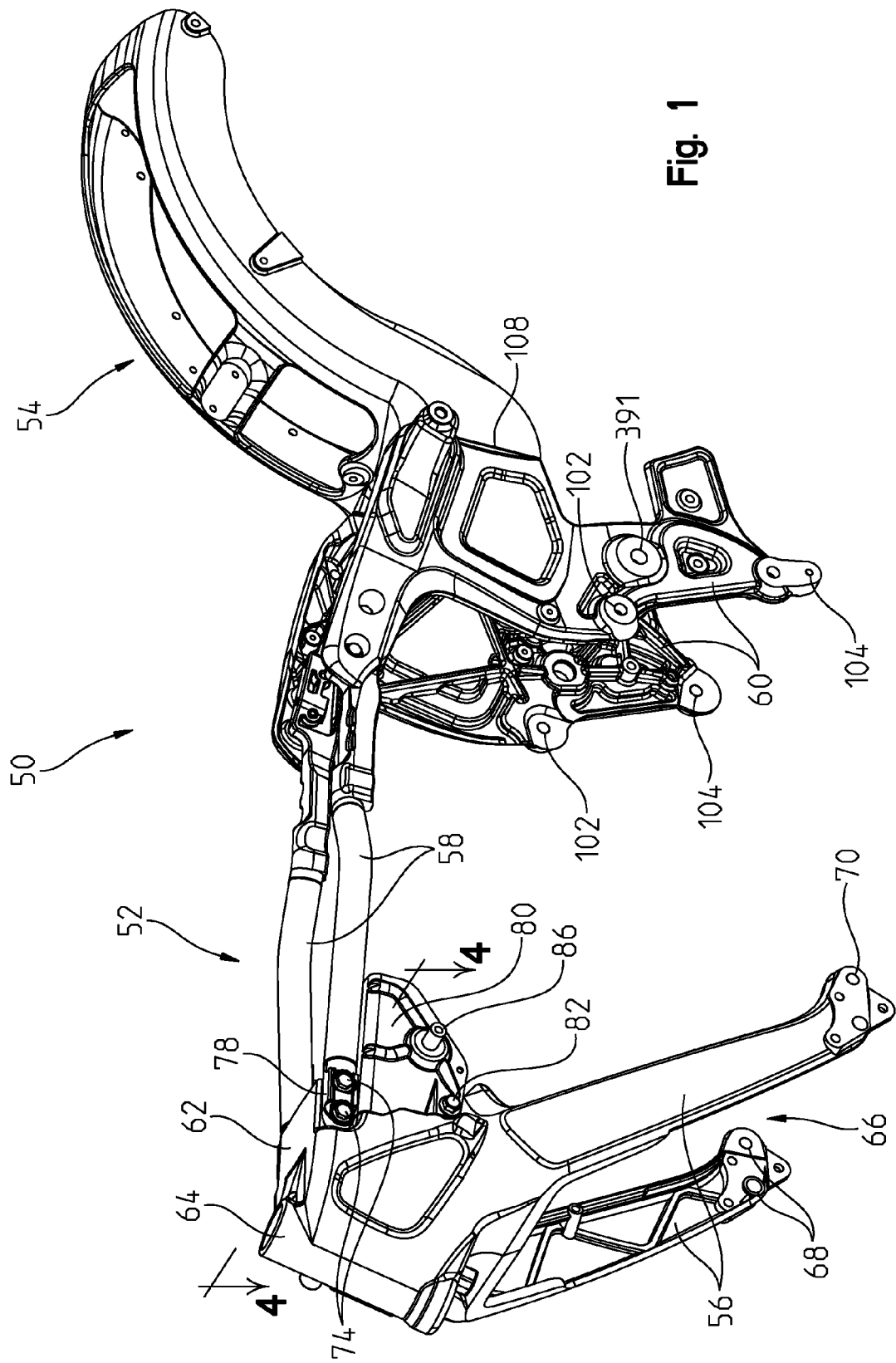
FIG. 1 is a left front perspective view of a frame assembly of a two-wheeled vehicle of the present disclosure.
Figure 2:
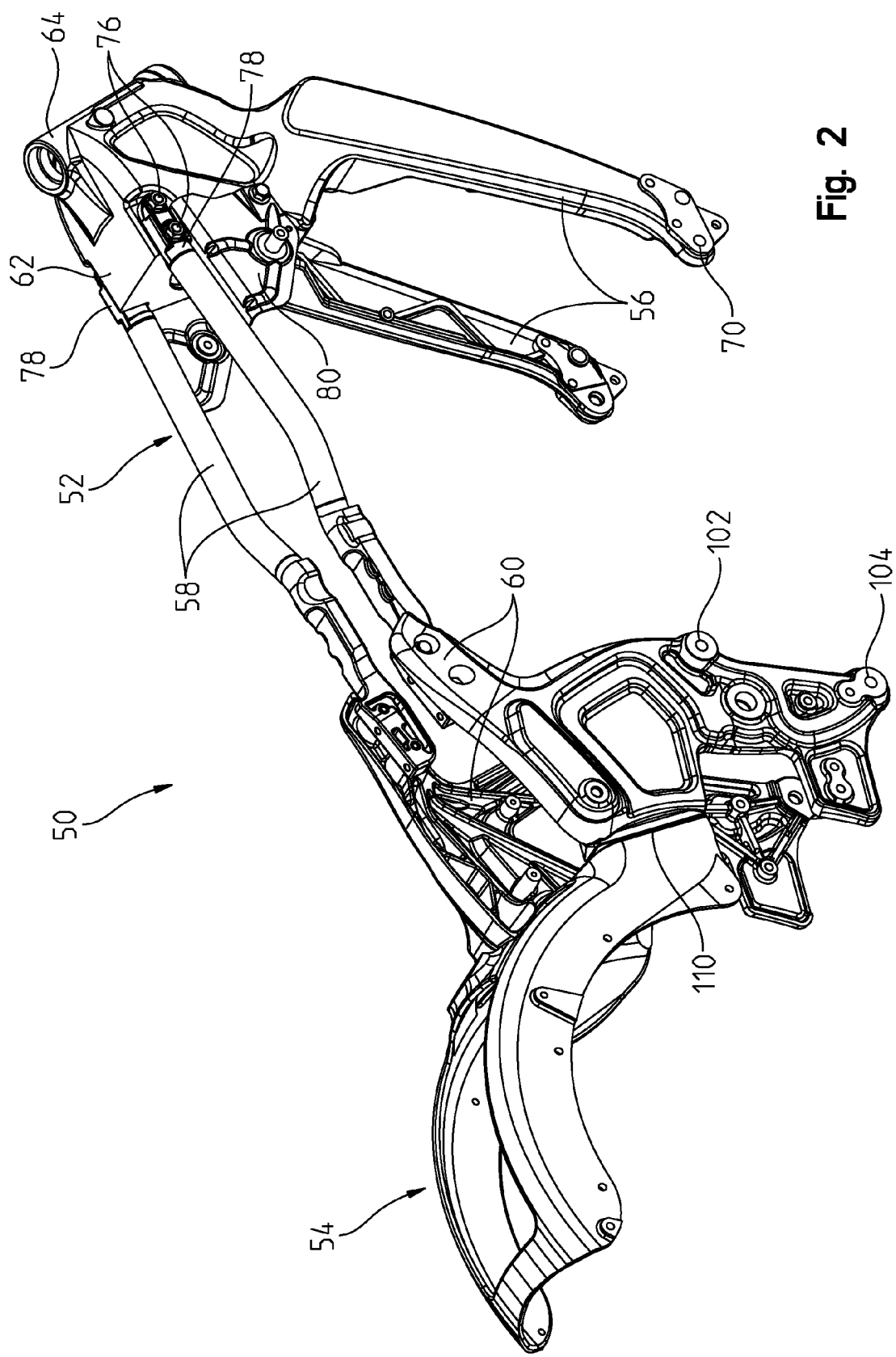
FIG. 2 is a right rear perspective view of the frame assembly of FIG. 1.
Figure 3:
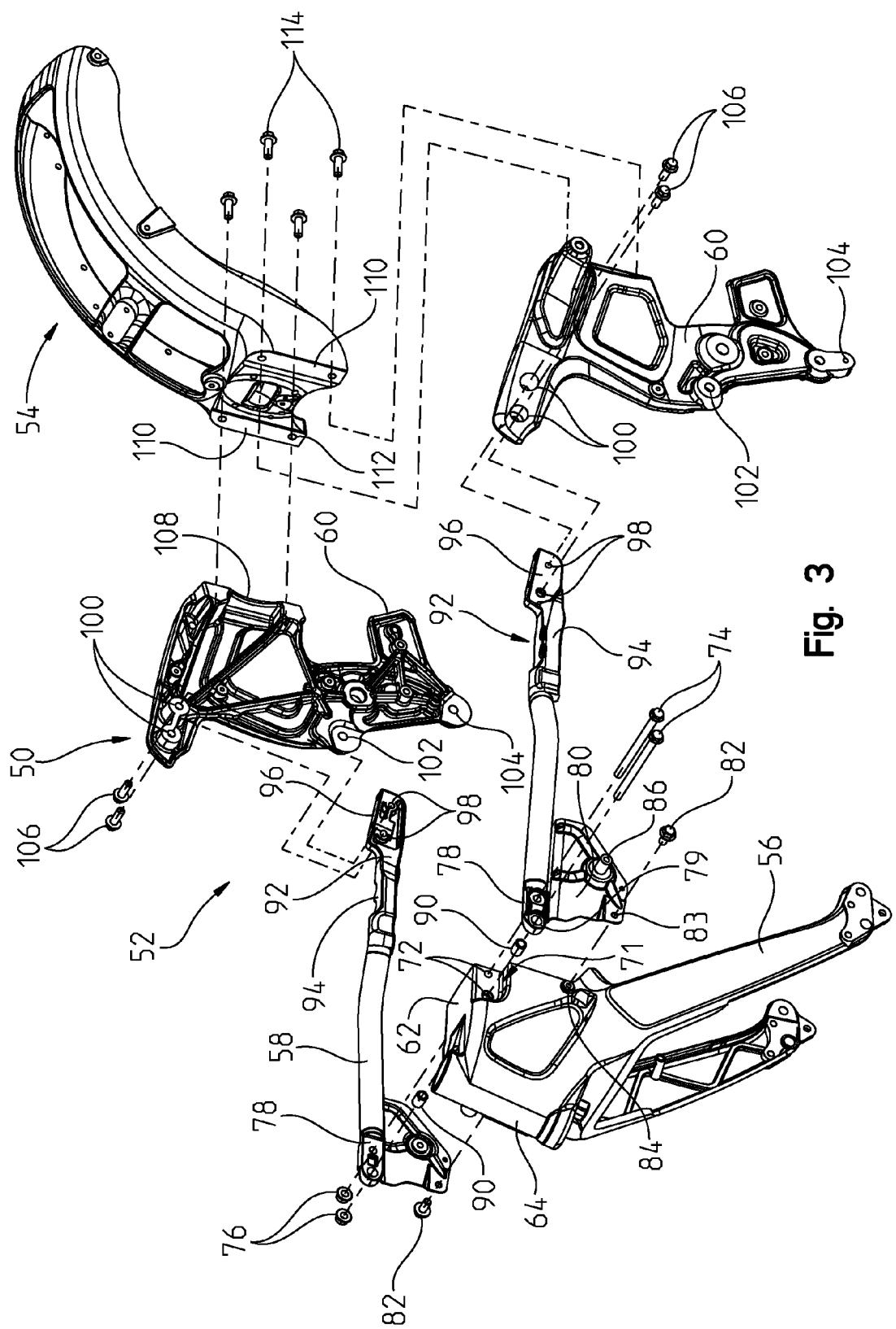
FIG. 3 is an exploded view of the frame assembly of FIG. 1.

Referring to FIGS. 3 and 4, frame rails 58 are coupled to head portion 62 with fasteners 74, 76. More particularly, front couplers 78 are positioned within recesses 71 of head portion 62 such that front couplers 78 are generally flush with head portion 62. Fasteners 74 extend through apertures 79 of front couplers 78 and apertures 72 of head portion 62. Illustratively, fasteners 74 enter head portion 62 on a left side of vehicle 2 and extend fully through head portion 62 to couple with fasteners 76 on a right side of vehicle 2. In one embodiment, dowels or spacers 90 may be positioned within apertures 79 of couplers 78 to accommodate varying tolerances in front frame 52. Alternatively, front frame 52 may not include dowels 90. Plates 80 also are coupled to head portion 62 when fasteners 82 are received through apertures 83 in plates 80 and apertures 84 in head portion 62. As shown in FIGS. 3 and 4, fasteners 82 are positioned below fasteners 74, 76. The configuration and coupling of frame rails 58 and plates 80 with head portion 62 eliminates the need for heating treating front frame 52.

Figure 5:
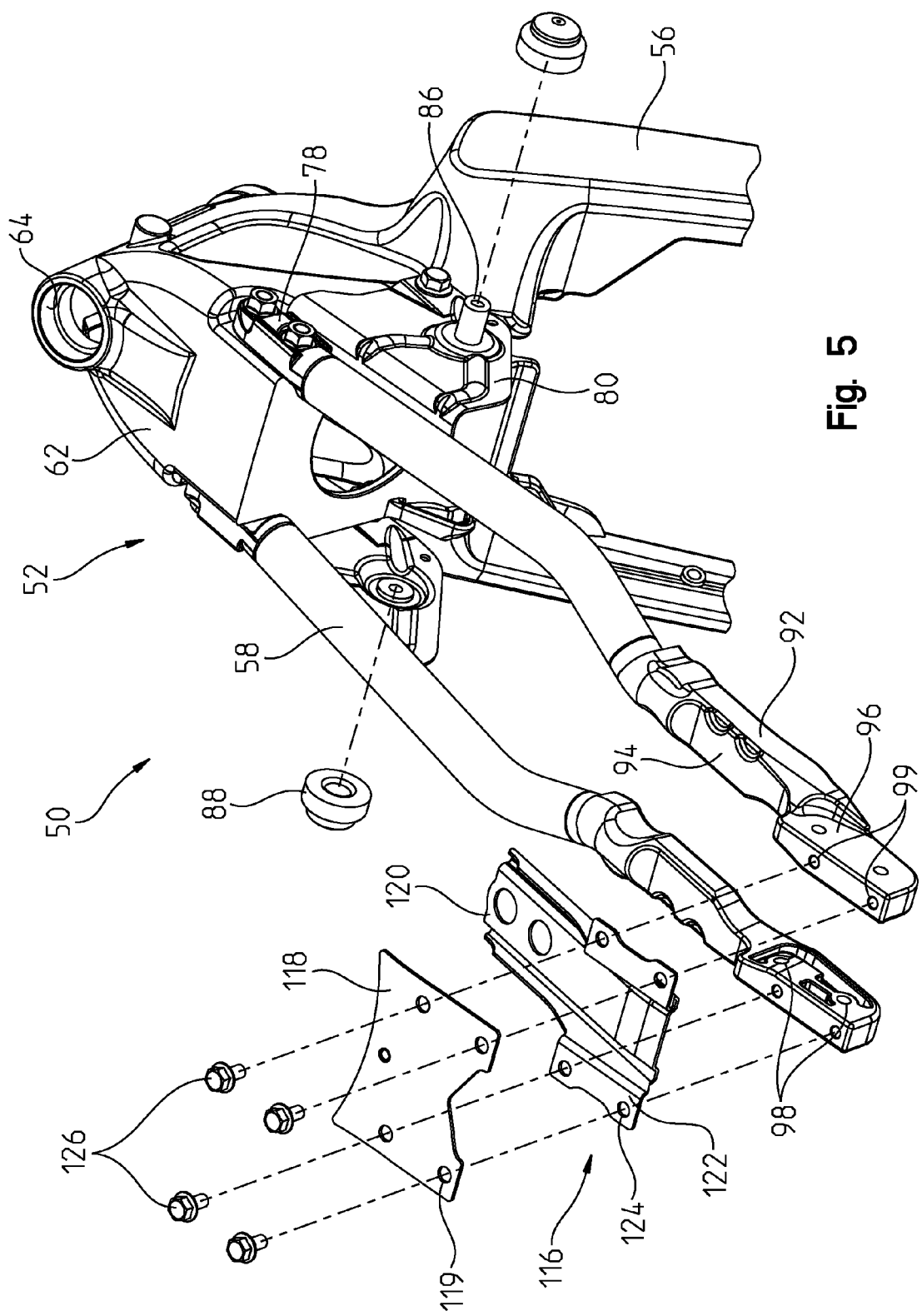
FIG. 5 is a right rear perspective view of a front frame portion of the frame assembly of FIG. 1 in a partially exploded manner.

The rearward ends of frame rails 58 may illustratively include rear couplers 92, which may be cast portions welded to frame rails 58. Alternatively, rear couplers 92 may be coupled to frame rails 58 with fasteners, such as bolts or rivets. As shown in FIGS. 3 and 5, rear couplers 92 include a planar portion 94 and an upright portion 96. Planar portion 94 extends laterally outward from upright portion 96 and is directly coupled to frame rails 58. Upright portion 96 includes a plurality of apertures 98 for coupling frame rails 58 to side members 60 of mid-frame 53. More particularly, fasteners 106 are received through apertures 100 of side members 60 and apertures 98 in order to couple side members 60 to frame rails 58.

Upright portion 96 further includes a plurality of apertures 99 for coupling with a support assembly 116, as shown in FIG. 5. Support assembly 116 includes a plate 118 having a plurality of apertures 119 and a bracket 120 having flanges 122. Flanges 122 include apertures 124. Plate 118 is positioned above bracket 120 and fasteners 126 are received through apertures 119 of plate 118, apertures 124 of flanges 122, and apertures 99 of upright portion 96 of rear couplers 92. As such, support assembly 116 is coupled to rear couplers 92.

Mid-frame 53 includes side members 60 extending downwardly from frame rails 58. As shown in FIGS. 1-3 and 6, side members 60 also extend outwardly from frame rails 58 of front frame 52. Side members 60 include a plurality of apertures 102, 104 for coupling with powertrain assembly 130, as detailed further herein. Illustratively, side members 60 are formed through casting methods.

As shown in FIG. 3, side members 60 also includes a rear interface 108 for coupling with rear frame 54. Rear frame 54 includes a front interface 110 that is complimentary with and coupled to rear interface 108 of side members 60 with a plurality of fasteners 114. Fasteners 114 extend through apertures 112 of front interface 110 of rear frame 54 and into apertures on rear interface 108 of side members 60. Illustratively, there are four fasteners 114 for coupling rear frame 54 to side members 60. As shown in FIG. 3, fasteners 114 extend a longitudinal direction (i.e., are generally parallel to the centerline).

Figure 6:
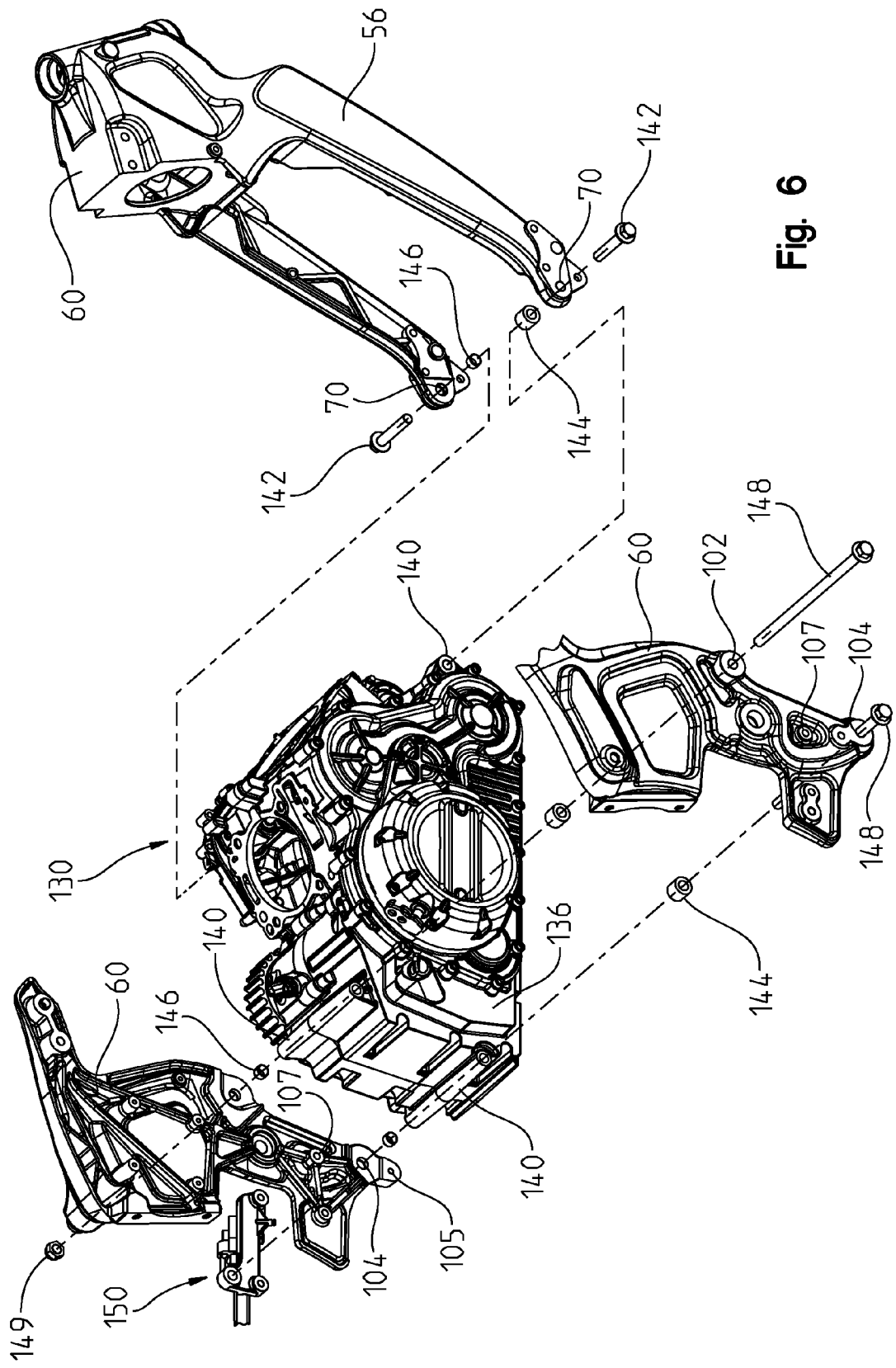
FIG. 6 is an exploded view of a powertrain assembly of the two-wheeled vehicle and the front frame portion of FIG. 5.

Referring now to FIG. 6, powertrain assembly 130 is coupled to front frame 52 of frame assembly 50. As detailed herein, powertrain assembly 130 is a structural member of vehicle 2 and couples front frame 52 to mid-frame 53 along a lower portion of vehicle 2. Powertrain assembly 130 includes an engine 132 and a transmission 138. In one embodiment, engine 132 and transmission 138 are an integral powertrain unit. Illustratively, engine 132 is a V-twin engine having two cylinders operably coupled to a crankcase 136. The cylinders and the corresponding cylinder heads may not include fins for cooling and, as such, engine 132 may be a liquid-cooled engine fluidly coupled to cooling assembly 240, as further detailed herein. Additional details regarding engine 132 and transmission 138 are disclosed in co-pending U.S. Provisional Patent Application Ser. No. 61/801,033, filed on Mar. 15, 2013, the complete disclosure of which is expressly incorporated by reference herein.

A front end of crankcase 136 and a rear end of crankcase 136 are coupled to frame assembly 50, however, the cylinders are not directly coupled to frame assembly 50. Crankcase 136 includes a plurality of lugs 140 for coupling with front frame 52 and mid-frame 53. In one embodiment, only crankcase 136 is directly coupled to front frame 52 and mid-frame 53. In this way, crankcase 136 may take up the loads in the bottom portion of front frame 52 and mid-frame 53. Additionally, frame rails 58 may be used to take up the loads in the top portion of front frame 52.

The front end of crankcase 136 includes lugs 140 that couple with the lower ends of front arm members 56. As shown in FIG. 6, fasteners 142 extend through apertures 70 in front arm members 56 and lugs 140 to support the front end of powertrain assembly 130 on front frame 52. Fasteners 142 also may extend through a spacer 144 and/or a locating dowel 146. Spacer 144 may be used to position powertrain assembly 130 on front frame 52. For example, as shown in FIG. 6, spacer 144 is coupled to the inner surface of front arm member 56 on the right side of vehicle 2. However, front arm member 56 on the left side of vehicle 2 may not include spacer 144. As such, powertrain assembly 130 may be shifted to the left within front frame 52 by spacer 144. Locating dowel 146 may be positioned within apertures 70 in order to accommodate varying tolerances between fasteners 142 and front arm members 56.

The rear end of crankcase 136 is coupled to mid-frame 53 through side members 60. In this way, crankcase 136 is a structural component of vehicle 2 and couples together the lower portions of front frame 52 and mid-frame 53. As shown in FIG. 6, fasteners 148 are received through apertures 102 and 104 of side members 60. Fasteners 148 extend through spacers 144 and into lugs 140 of crankcase 136. Illustratively, spacers 144 are positioned on a right side of crankcase 136 such that powertrain assembly 130 is shifted to the left in frame assembly 50. Fasteners also may extend through locating dowels 146, which may be positioned within apertures 102 and 104 of side members 60. Locating dowels 146 may accommodate varying tolerances between fasteners 142 and side members 60. Fasteners 149 couple with fasteners 148 to secure the rear end of crankcase 136 to side members 60.

Frame rails 58 are positioned above powertrain assembly 130 and may be removed from front frame 52 and mid-frame 53 in order to assemble and service powertrain assembly 130. For example, spark plugs may extend from the center of the heads of the cylinders or may be positioned at an angle on the heads of the cylinders. As such, by removing frame rails 58, spark plugs and other components of powertrain assembly 130 (e.g., cylinders 74) may be repaired or replaced without the need to uncouple powertrain assembly 130 from frame assembly 50. In other words, powertrain assembly 50 does not need to be "dropped out" of frame assembly 50 for repairs or maintenance. Additionally, due to the ease of accessing portions of powertrain assembly 130, powertrain assembly 130 may be positioned low on frame assembly 50, thereby lowering the center of gravity of vehicle 2. It may be appreciated that fuel tank 330 and seat 28 are removed in order to access powertrain assembly 130. Additionally, at least one frame rails 58 may be removed in order to facilitate access to powertrain assembly 130.

Figure 7:
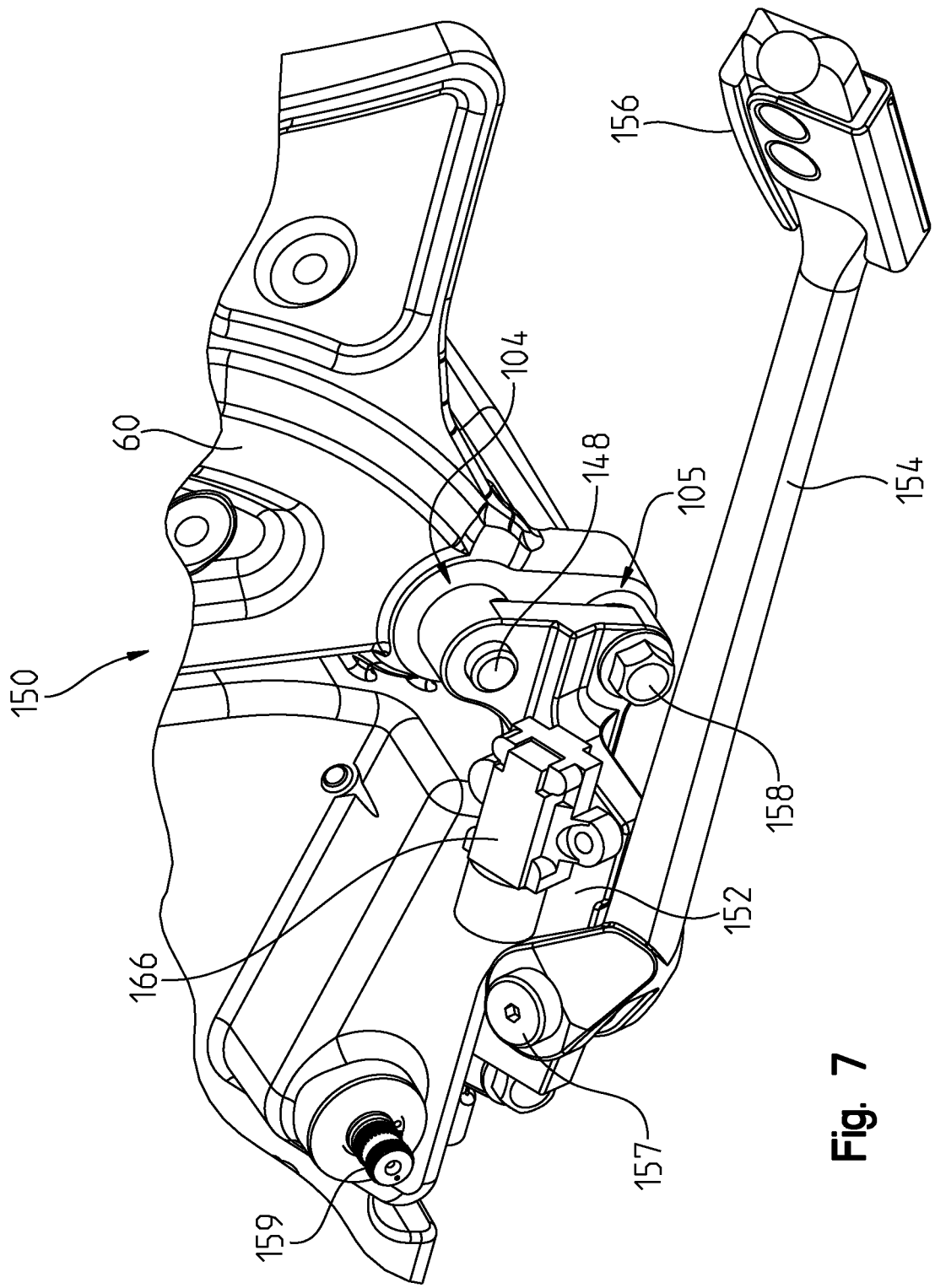
FIG. 7 is a left rear perspective view of a side stand of the two-wheeled vehicle of FIG. 1.

As shown in FIGS. 6 and 7, two-wheeled vehicle 2 may include a side stand assembly 150 coupled to crankcase 136 and/or side members 60. In one embodiment, side stand assembly 150 is coupled to crankcase 136 and/or side members 60 in three locations. Illustratively, side stand assembly 150 includes a base member 152, a lever arm 154, and a foot member 156. Base member 152 is coupled to lever arm 154 with a pivot pin 157 and is coupled to crankcase 136 with fasteners 158. More particularly, fastener 158 extends through an aperture 105 of side member 60 of mid-frame 53 in order to couple side stand assembly 150 with frame assembly 50. Additionally, side stand assembly 150 may be coupled to side member 60 with fastener 148 extending through aperture 104 of side member 60. Alternatively, side stand assembly 150 may be coupled to a fastener 159 extending from crankcase 136 of powertrain assembly 130. In a further embodiment, side stand assembly 150 may be adjacent the front end of crankcase 136 to further increase the stability of vehicle 2.

In operation, lever arm 154 may be rotated about pivot pin 157 to position foot member 156 against a ground surface. In this way, vehicle 2 is supported on the ground surface with side stand assembly 150. When vehicle 2 is operating, lever arm 154 may be pivoted about pivot pin 157 to the position shown in FIG. 7, such that side stand assembly 150 does not interfere with the ground surface.

In one embodiment, side stand assembly 150 includes a sensor member 166. Sensor member 166 may send a signal to the electrical system of vehicle 2 (e.g., the engine control unit ("ECU") or the vehicle control unit ("VCU")) to indicate that vehicle 2 is not operational and/or is leaning on side stand assembly 150. As such, the ECU and/or VCU may signal other components of vehicle 2 when side stand assembly 150 is engaged.

Figure 8:
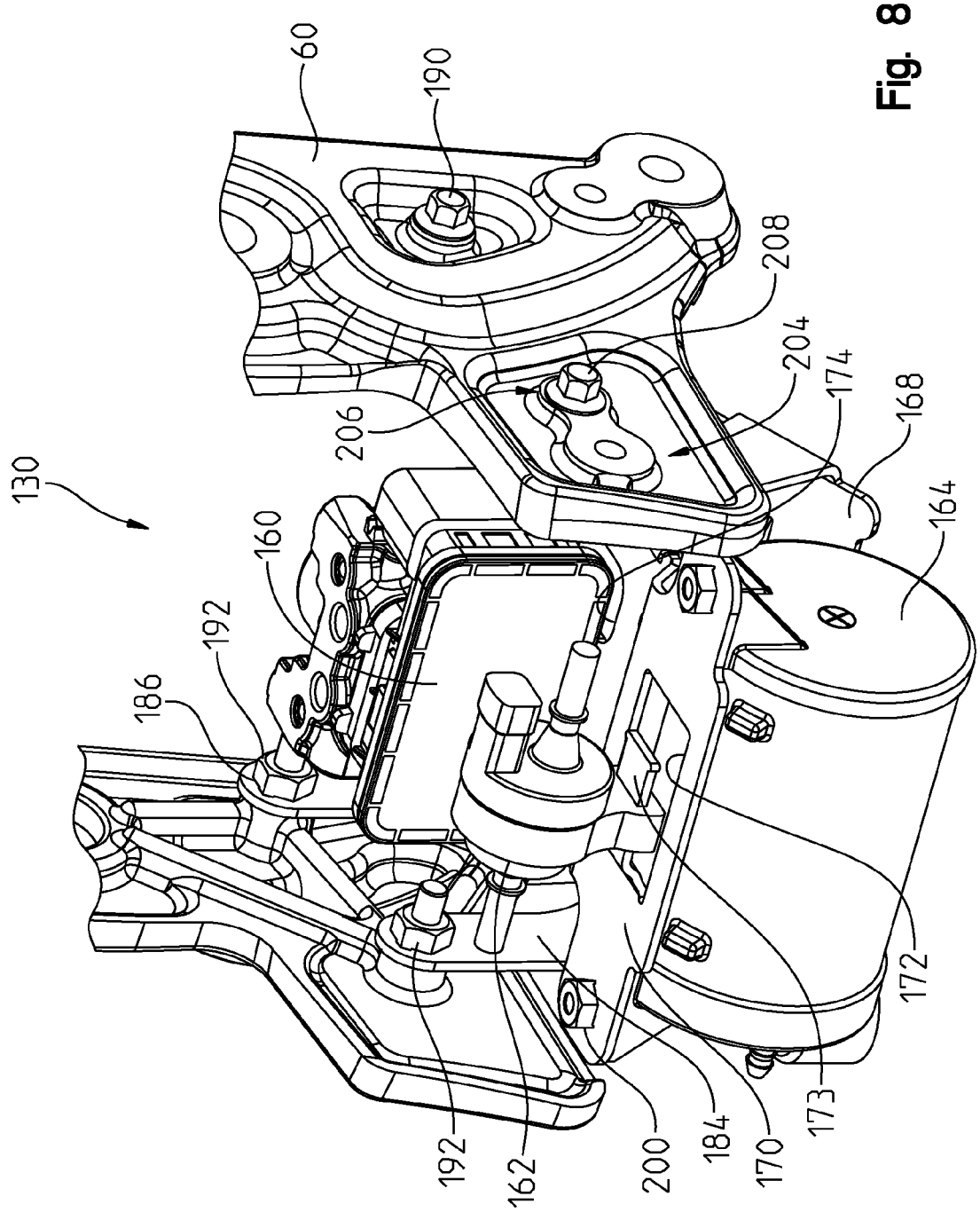
FIG. 8 is a right rear perspective view a portion of the powertrain assembly of FIG. 6.
Figure 9:
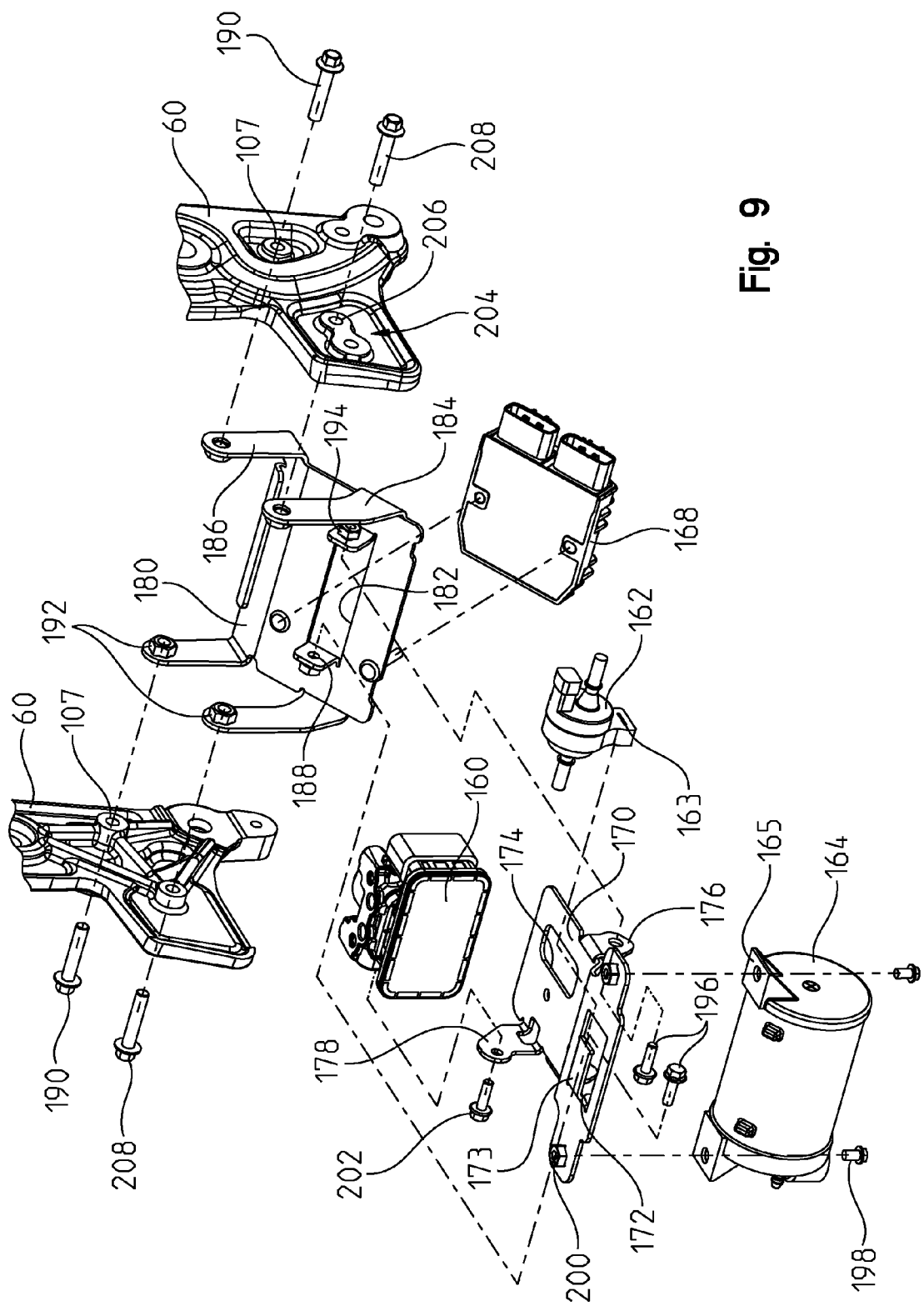
FIG. 9 is an exploded view of the portion of the powertrain assembly of FIG. 8.

Referring now to FIGS. 8 and 9, a rear end of side members 60 supports the rear end of powertrain assembly 130. As shown, an anti-lock brake module 160 of brake assembly 12, a purge valve 162 operably coupled to fuel tank 300, an evaporator canister 164 operably coupled to fuel tank 300, and a voltage regulator 168 of the electrical system are supported at the rear end of side members 60. Purge valve 162 and evaporation canister 164 are provided for eliminating air and water from fuel lines. It may be appreciated that anti-lock brake system module 160, purge valve 162, evaporation canister 164, and voltage regulator 168 are positioned below a swing arm 382 of rear suspension assembly 380.

As shown in FIGS. 8 and 9, a support plate 170 includes a first opening 172 having a cantilevered arm 173 extending therein. Support plate 170 also includes a second opening 174, which is positioned forward of, and is larger than, first opening 172. First and second openings 172, 174 may be included for cooling anti-lock brake system module 160, purge valve 162, evaporation canister 164, and/or voltage regulator 168. Support plate 170 also includes an upper tab 178 for coupling to anti-lock brake module 160 with a fastener 202, and a plurality of lower tabs 176 for coupling to a support base 180 with fasteners 196.

Support base 180 includes an opening 182. Upstanding tabs 188 extend upwardly from opposing sides of opening 182. Lower tabs 176 of support plate 170 align with upstanding tabs 188 of support base 180 and are coupled thereto with fasteners 196 and 194. Illustratively, fasteners 196 are bolts and fasteners 194 are weld nuts. Alternative embodiments of fasteners 194, 196 may be used to couple support plate 170 to support base 180.

Additionally, support base 180 includes forward arms 186 and rearward arms 184. Forward arms 186 couple support base 180 to side members 60 with fasteners 190. More particularly, fasteners 190 extend through apertures 107 in side members 60 and couple with inner fasteners, illustratively weld nuts 192, on forward arms 186. Similarly, fasteners 208 couple rearward arms 184 of support base 180 to side members 60. As shown in FIG. 9, the rear ends of side members 60 includes tabs 204 having apertures 206. Fasteners 208 extend through apertures 206 in tabs 204 and couple with fasteners, illustratively weld nuts 192, on rearward arms 184.

Both support plate 170 and support base 180 are positioned between side members 60 such that anti-lock brake system module 160, purge valve 162, evaporation canister 164, and voltage regulator 168 also are generally supported between side members 60. In one embodiment, voltage regulator 168 is coupled to an underside of support base 180 and extends below side members 60. In this way, voltage regulator 168 is positioned below swing arm 382 of rear suspension assembly 380 in order for cooling air to flow across voltage regulator 168. Similarly, evaporation canister 164 may be coupled to the underside of support plate 170 with fasteners 198 and 200 and also extends below side members 60. As shown, evaporation canister 164 may include brackets 165 for coupling to support plate 170.

Purge valve 162 and anti-lock brake system module 160 may be supported above support plate 170 and support base 180. For example, purge valve 162 may include a slot 163 which receives cantilevered arm 173 of support plate 170. In this way, purge valve 162 may slide onto cantilevered arm 173 within first opening 172 of support plate 170. Additionally, anti-lock brake system module 160 is coupled to upper tab 178 with fastener 202 and is generally positioned above second opening 174.

Figure 10:
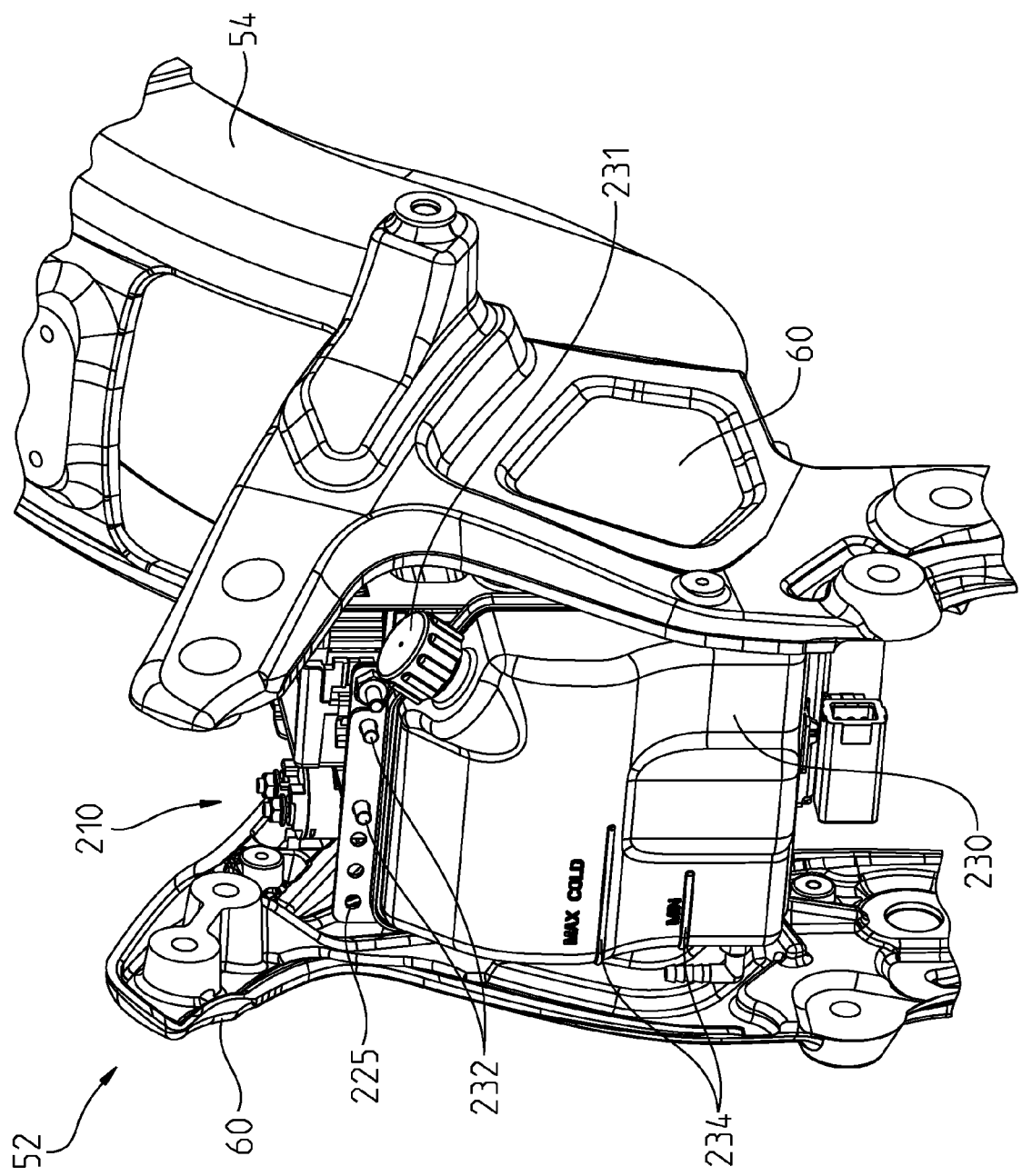
FIG. 10 is a left front perspective view of a portion of an electrical system and a coolant bottle of the two-wheeled vehicle of FIG. 1.
Figure 11:
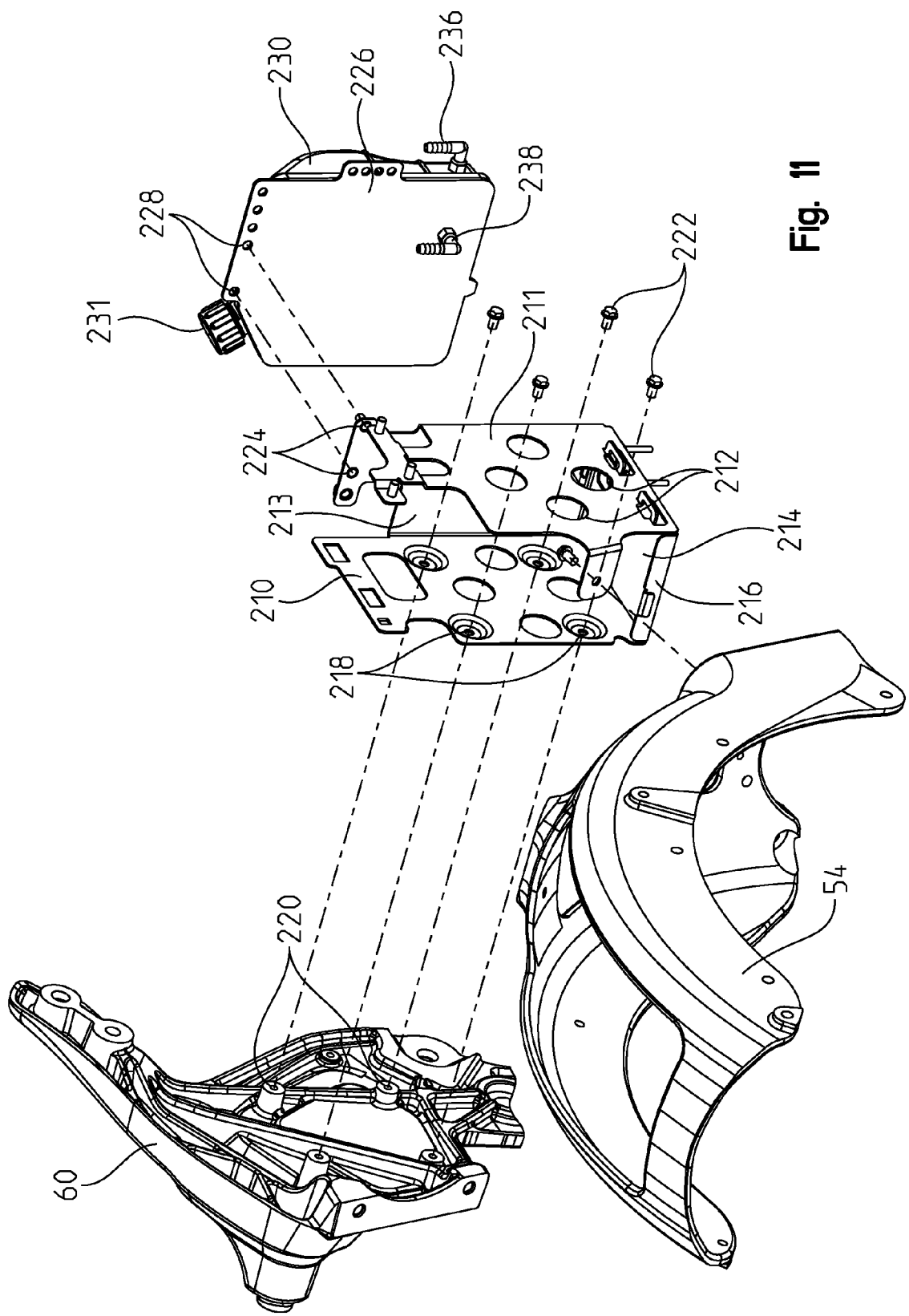
FIG. 11 is an exploded view of the portion of the electrical system and the coolant bottle of FIG. 10.

Referring to FIGS. 10 and 11, an upper portion of side members 60 of mid-frame 53 supports a casing 210 for at least one battery and other components of the electrical system, such as a control module, a solenoids, and fuses. Additionally, casing 210 may support a coolant bottle 230. Seat 28 (FIG. 24) may be positioned above casing 210 and coolant bottle 230. Coolant bottom 230 is positioned adjacent powertrain assembly 130 and, as such, is exposed to the heat generated by powertrain assembly 130. Therefore, coolant bottle 230 is comprised of a material configured to withstand the heat of powertrain assembly 130. In one embodiment, coolant bottle 230 is comprised of a nylon filled material.

Coolant bottle 230 also is opaque and may be black in color. In this way, various electrical components supported by casing 210 are concealed, thereby increasing the aesthetics of vehicle 2. However, because coolant bottle 230 is opaque, the fluid within coolant bottle 230 may not be visible. As such, coolant bottle 230 includes clear sight lines 234 which allow the operator to see the level of fluid within coolant bottle 230. Alternatively, the front surface of coolant bottle 230 may be opaque and the rear surface may be clear to allow an operator to see the fluid therein. Additionally, coolant bottle 230 includes nipples 236, 238 which are configured to receive coolant lines in order to flow coolant fluid from coolant bottle 230. The coolant lines (not shown) may be clear. Additionally, illustrative coolant bottle 230 includes a cap 231, however, alternative embodiments of coolant bottle 230 may include a plug. The plug may be configured to receive a funnel to facilitate the flow of additional coolant poured into coolant bottle 230.

As shown best in FIG. 11, a plate 226 may be coupled to the rear side of coolant bottle 230 to support coolant bottle 230 on casing 210. More particularly, plate 226 may include apertures 228 that align with apertures 224 on casing 210 and receive fasteners 225 (FIG. 10) therethrough.

Casing 210 faces away from powertrain assembly 130 and includes side walls 211 having a plurality of openings 212, a front wall 213, and a bottom wall 214. Fasteners 222 may be received through apertures 218 of side wall 211 and apertures 220 of side member 60 in order to couple casing 210 to mid-frame 53. At least one battery may be positioned within casing 210 and, more particularly, the battery may be supported by bottom wall 214 and secured by a lip 216 extending upwardly from bottom wall 214. Additionally, the battery may be positioned between side walls 211 and rearward of front wall 213. Openings 212 in side walls 211 allow any heat generated by the battery to escape from casing 210. Other components of the electrical system of vehicle 2 may be supported on the outer surfaces of side walls 211 and bottom wall 214.

Referring now to FIGS. 12-15, cooling assembly 240 includes a radiator 242, a fan 244 positioned rearward of radiator 242, and a shroud 246 positioned at the lower end of radiator 242. In one embodiment, cooling assembly 240 includes a pump operably coupled to powertrain assembly 130 in order to liquid cool engine 132. Additional details of cooling assembly 240 are disclosed in co-pending U.S. Provisional Patent Application Ser. No. 61/801,033, filed on Mar. 15, 2013, the complete disclosure of which is expressly incorporated by reference herein.

Illustrative radiator 242 includes a plurality of vertical fins 243. Cooling assembly 240 is supported on front arm members 56 of front frame 52. More particularly, cooling assembly 240 is supported within pocket 66 of front frame 52 such that head portion 62 and front arm members 56 generally surround cooling assembly 240. Cooling assembly 240 is forward of powertrain assembly 130 and is adjacent engine 132. By positioning cooling assembly 140 close to powertrain assembly 130, the wheel base of vehicle 2 may be decreased.

Figure 12:
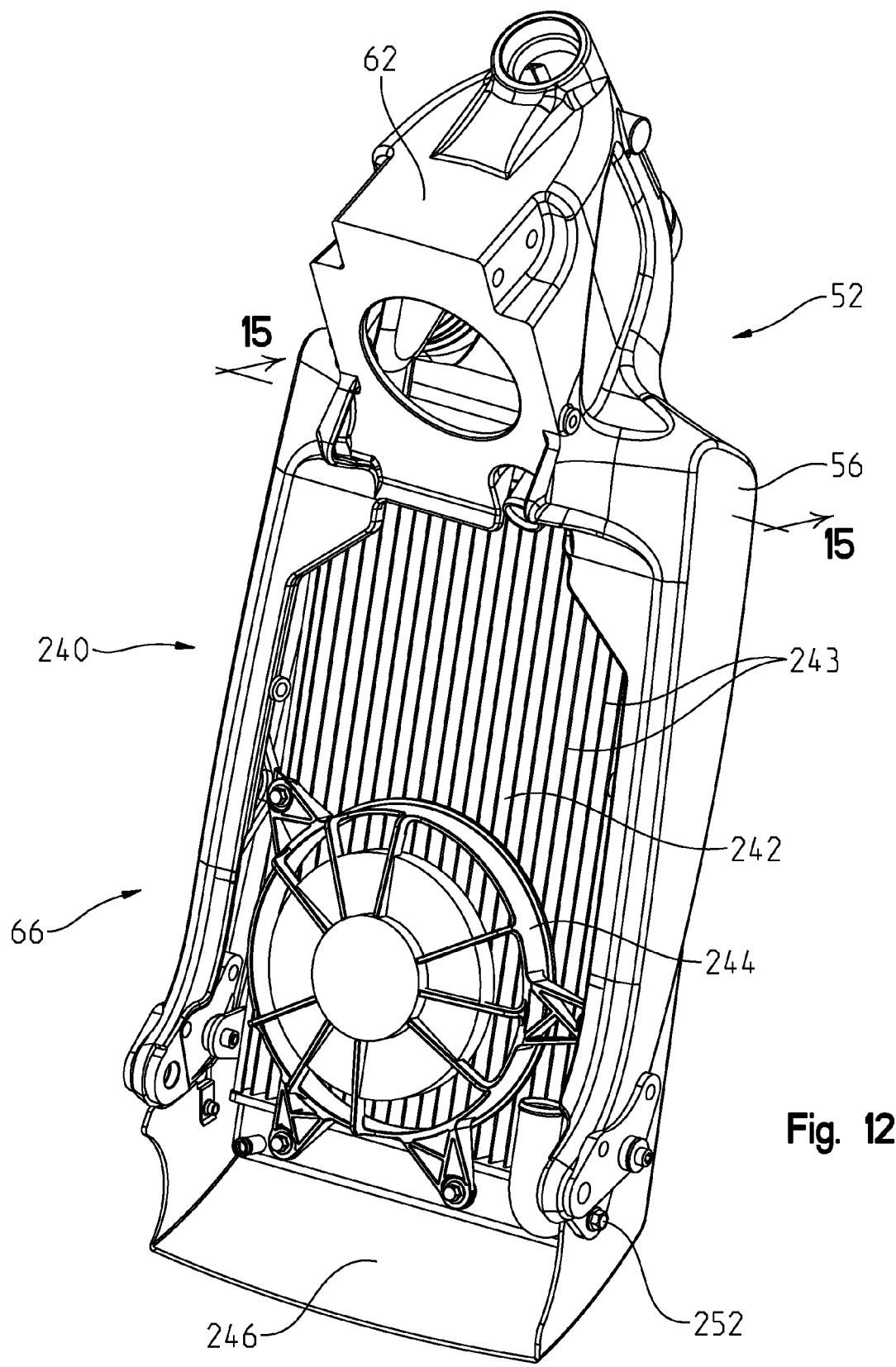
FIG. 12 is a right rear perspective view of a radiator assembly coupled to a portion of the frame assembly of FIG. 1.
Figure 13:
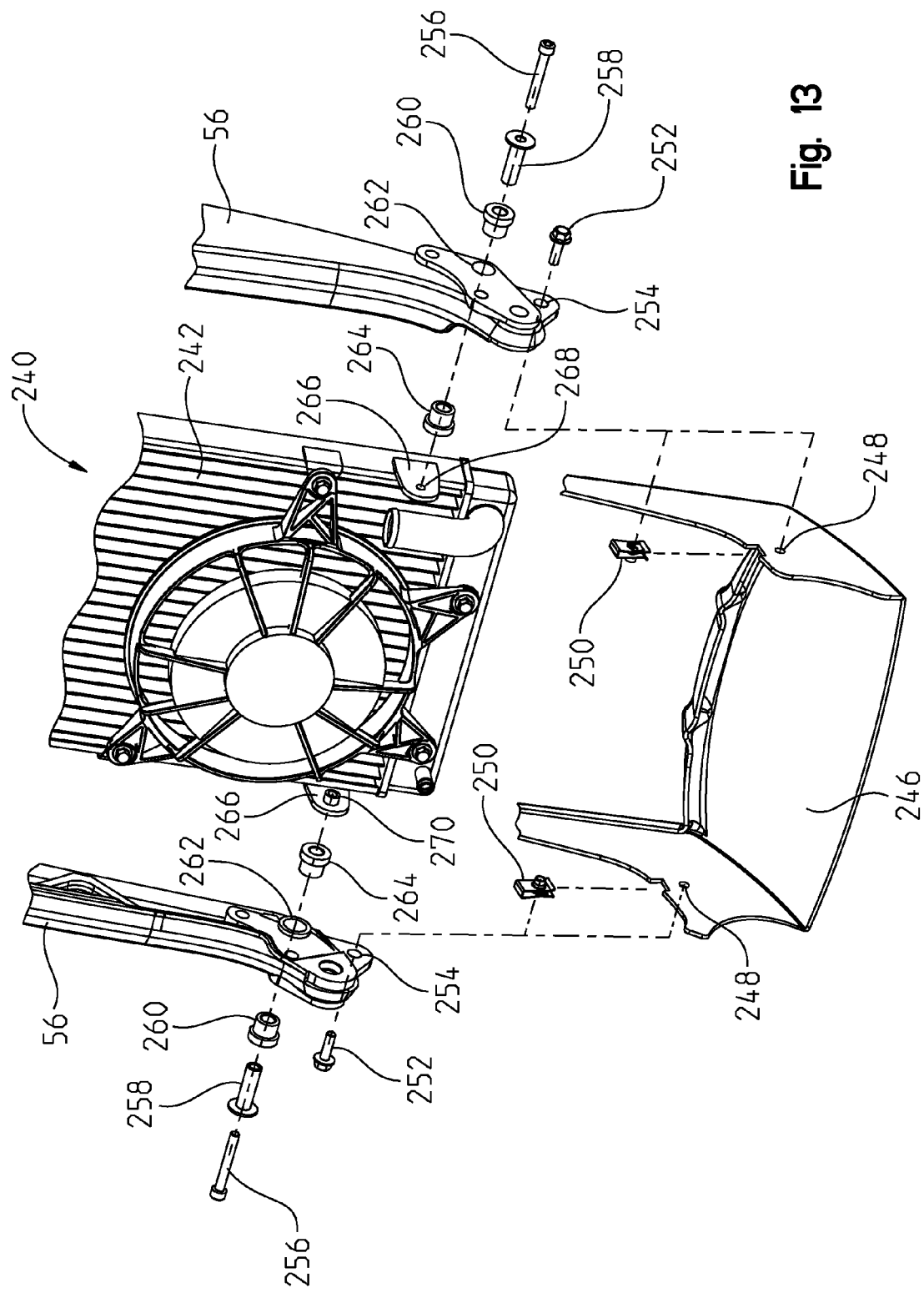
FIG. 13 is an exploded view of a lower portion of the radiator assembly and frame assembly of FIG. 12.

As shown in FIGS. 12 and 13, shroud 246 surrounds the lower end of radiator 242 and is positioned below fan 244. Shroud 246 may improve air flow into cooling assembly 240. Shroud 246 is coupled to front arm members 56 with fasteners 252. More particularly, fasteners 252 extend through apertures 248 in shroud 246 and apertures 254 in the lower ends of front arm members 56. Fasteners 252 couple with fasteners 250 along an inner surface of shroud 246.

The lower end of radiator 242 is coupled to the lower end of front arm members 56 with fasteners 256. As shown in FIG. 13, apertures 262 of front arm members 56 align with apertures 266 in tabs 268 on radiator 242. As such, fasteners 256 may extend through sleeves 258, bushings 260 and 264, and apertures 262 and 266 in order to couple with a fastener 270 (e.g., a weld nut) and secure cooling assembly 240 to front frame 52. Bushings 260 and 264 may be comprised of a polymeric material, for example rubber, for isolating cooling assembly 240 from vibrations.

Figure 14:
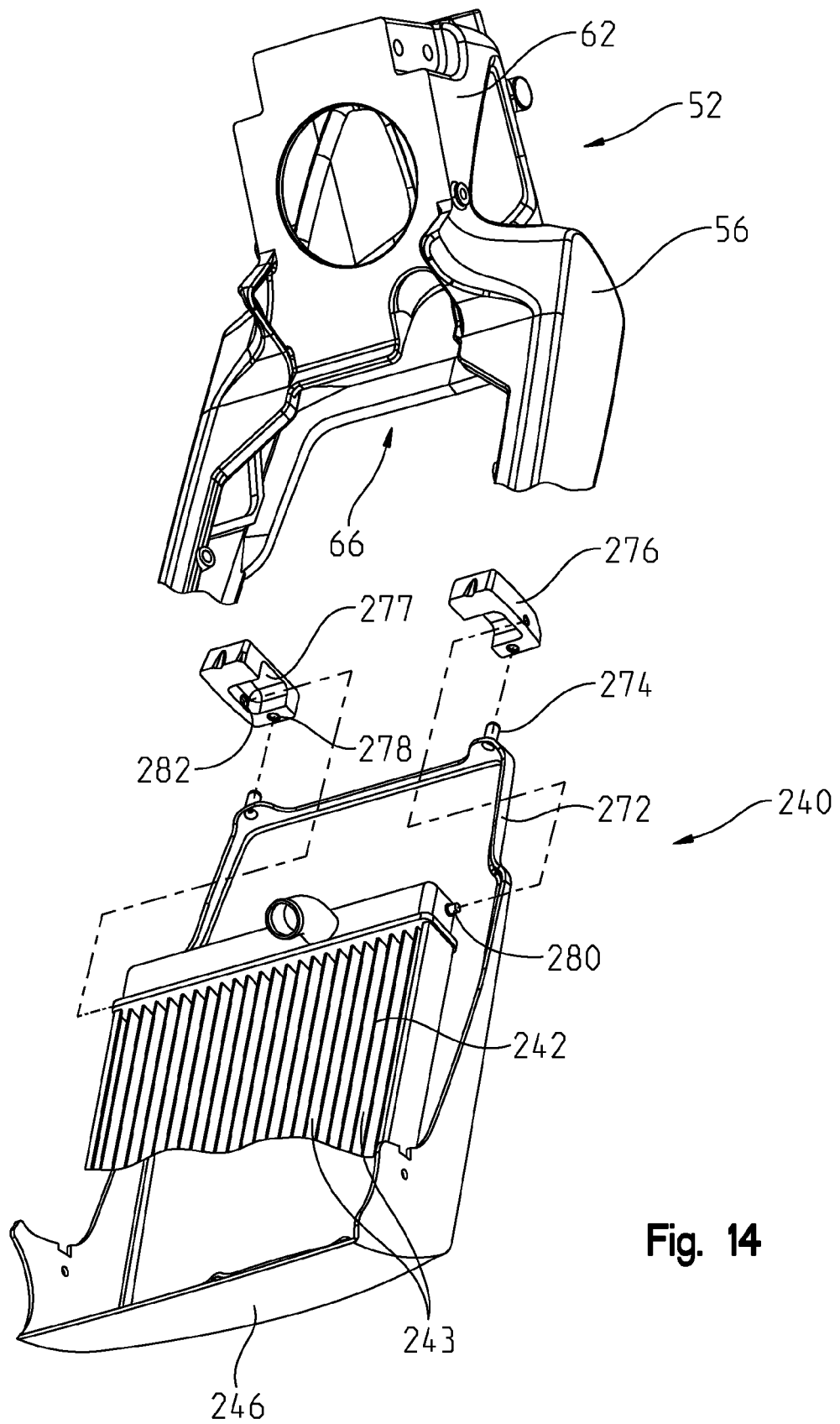
FIG. 14 is an exploded view of an upper portion of the radiator assembly and frame assembly of FIG. 12.
Figure 15:
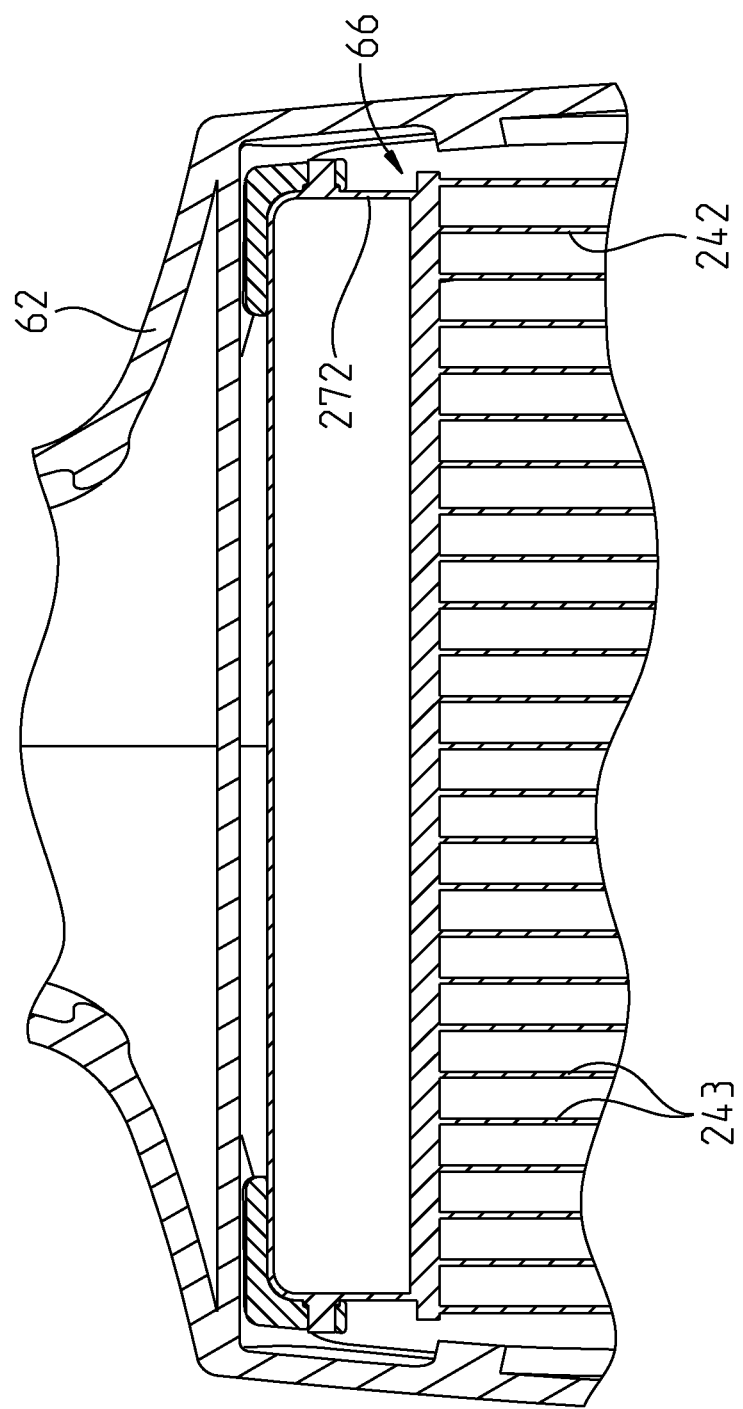
FIG. 15 is a rear cross-sectional view of the upper portion of the radiator assembly of FIG. 12, taken along line 15-15 of FIG. 12.
Figure 16:
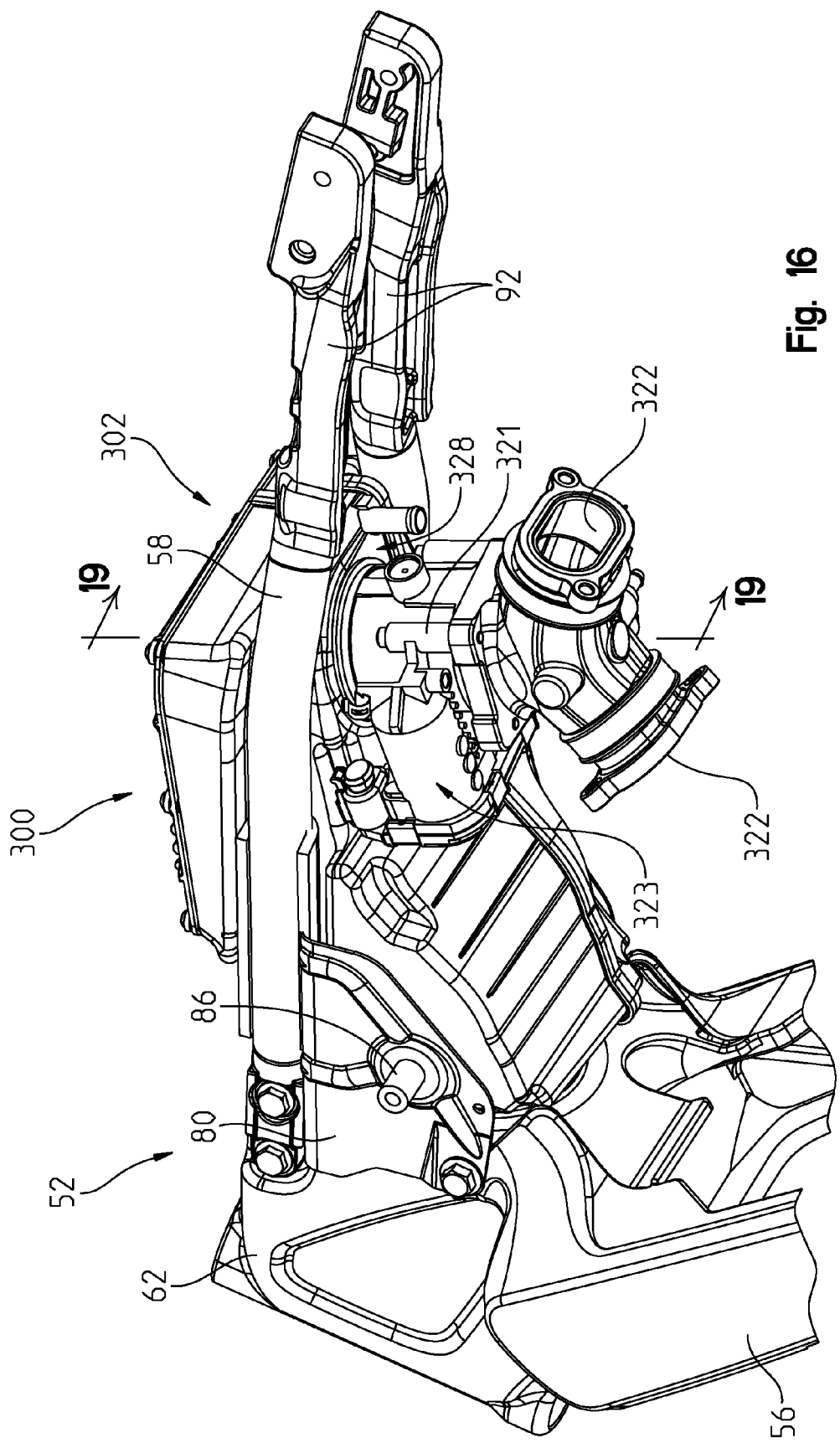
FIG. 16 is a left rear perspective view of an air intake assembly coupled to front frame of FIG. 1.

As shown in FIGS. 14 and 15, the upper end of cooling assembly 240 includes a frame structure 272 coupled to shroud 246. Illustratively, frame structure 272 may be integrally coupled to shroud 246. Cooling assembly 240 also includes brackets 276 for coupling frame structure 272 to front frame 52. Brackets 276 may be comprised of a polymeric material, for example rubber, and may isolate cooling assembly 240 from vibrations. Brackets 276 may be coupled to head portion 62 and/or front arm members 56 of front frame 52. As shown in FIG. 14, frame structure 246 includes projections 274 which are received within apertures 278 of bracket 276. When projections 274 extend into apertures 278, a portion of frame structure 272 is received within recesses 277 of bracket 276. Brackets 276 also include apertures 282 for receiving posts 280 extending laterally from radiator 242. In this way, brackets 276 are coupled to both radiator 242 and frame structure 272 in order to couple cooling assembly 240 to front frame 52.

It may be appreciated that only the lower end of cooling assembly 240 is directly coupled to front frame 52. The upper end of cooling assembly 240 is secured within front frame 52 with brackets 276. In this way, cooling assembly 240 may be uncoupled from front frame 52 at the lower end thereof and configured to slide, pivot, or otherwise move in a downward and/or forward direction in order to access powertrain assembly 130. For example, cooling assembly 240 may pivot about sleeves 258 to move radiator 242 away from powertrain assembly 130. In another embodiment, cooling assembly 240 may slide in a downward direction along front arm members 56 in order to move radiator 242 away from powertrain assembly 130. As such, cooling assembly 240 is easily removed from vehicle 2 in order to access powertrain assembly 130 for repairs and maintenance without the need to uncouple powertrain assembly 130 from frame assembly 50.

Referring to FIGS. 16-19, air intake assembly 300 includes an airbox 302 and an accumulator space 324. Additionally, in one embodiment, the air flowing through air intake assembly 300 may be pressurized by a pressure device. Air intake assembly 300 is positioned below fuel tank 330 and is supported on frame rails 58 of front frame 52, as detailed further herein. A portion of airbox 302 extends above frame rails 58 of front frame 52 and a portion of airbox 302 extends below frame rails 58 to couple with a throttle body 321. Air intake assembly also is positioned rearward of head portion 62 of front frame 52.

Figure 19:
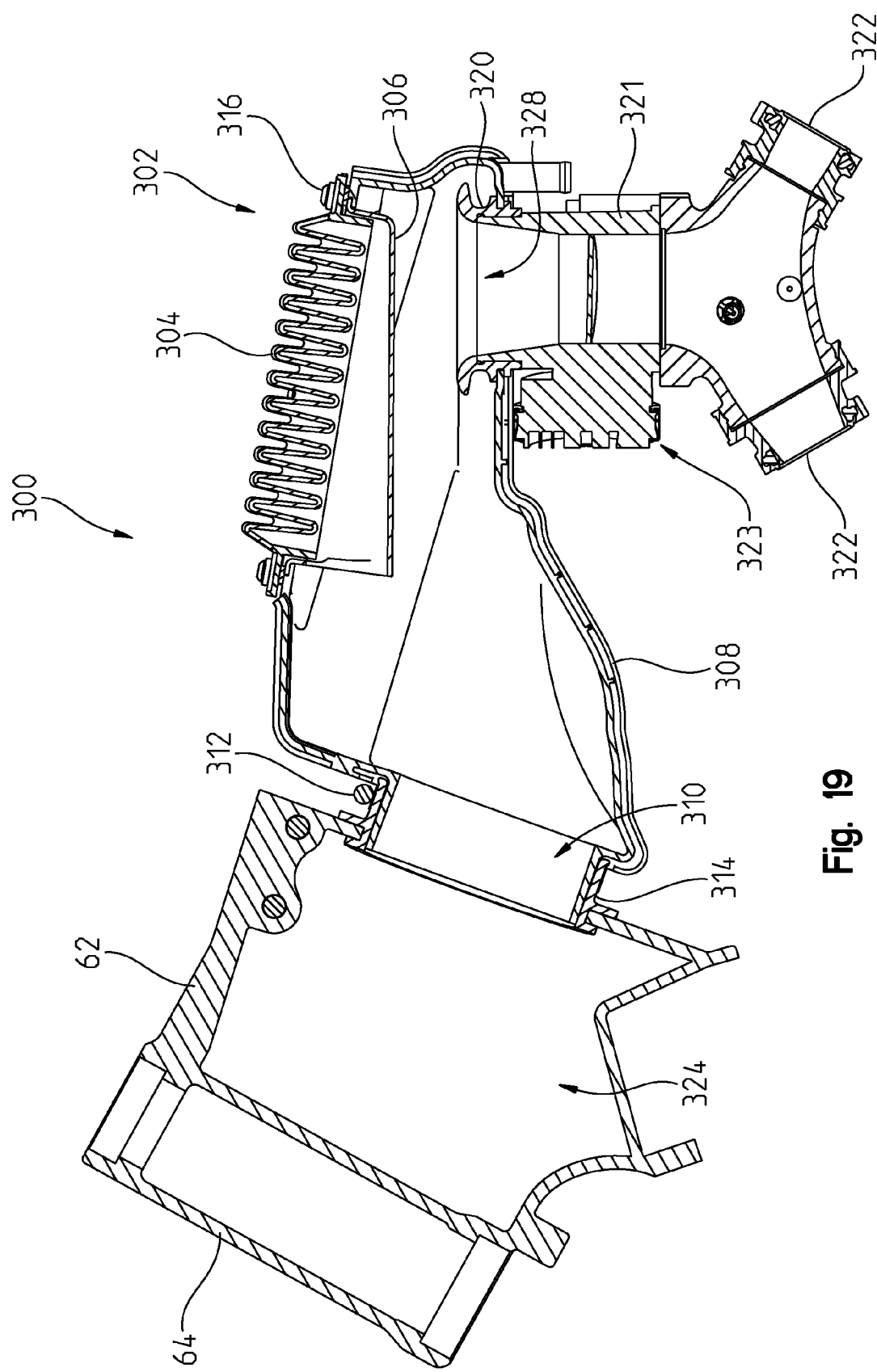
FIG. 19 is a side cross-sectional view of the air intake assembly of FIG. 16, taken along line 19-19 of FIG. 16.

Illustratively, airbox 302 includes a filter 304, a tray 306, and a base 308. Tray 306 rests atop an inset surface 319 of base 308. Filter 304 is positioned above tray 306. Filter 304 is coupled to base 308 with fasteners 316 that are received within apertures 318 of base 308. As shown in FIGS. 18 and 19, tray 306 is angled downwardly into base 308 such that air entering tray 306 is directed toward accumulator space 324. Accumulator space 324 is defined within head portion 62 of front frame 52. Illustratively, accumulator space 324 is positioned rearward of head tube 64. An opening 325 in head portion 62 engages a seal 314 on an accumulator outlet 310 of base 308. Accumulator space 324 increases the size of airbox 302 by forming an additional or secondary air volume for the air entering airbox 302.

Base 308 is sealingly coupled to head portion 62 of front frame 52 with seal 314 and a clamp 312. Additionally, base 308 includes a throttle body outlet 328 which is sealingly coupled to throttle body 321 with a seal 320. Throttle body 321 includes outlet ports 322 and may also include an electronic throttle control ("ETC") actuator 323 operably coupled thereto. Outlet ports 322 extend below airbox 302 and below frame rails 58 in order to provide air to the two cylinders of engine 132.

The side surfaces of base 308 include recesses 327 for receiving isolators 326. Isolators 326 may be comprised of a polymeric material, for example rubber, for isolating air intake assembly 300 from vibration. Furthermore, isolators 326 are contoured to extend within recesses 327 of base 308 and to extend around frame rails 58. As such, air intake assembly 300 is positioned between frame rails 58 and is secured thereto with isolators 326. Additionally, air intake assembly 300 is positioned intermediate fuel tank 330 and throttle body 321. Illustratively, air intake assembly 300 is not coupled to frame assembly 50 with any fasteners but rather is frictionally retained between frame rails 58, fuel tank 330, and throttle body 321. To access and/or remove air intake assembly 300 from vehicle 2, one frame rail 58 may be temporarily removed from frame assembly 50 in order to remove airbox 302 therefrom.

While vehicle 2 is operating, ambient air flows under fuel tank 330 and into air intake assembly 300. More particularly, ambient air flows into filter 304 of airbox 302, where dirt, debris, and other particulate matter is filtered from the ambient air such that the air in airbox 302 is "clean" air. In one embodiment, filter 304 is comprises of a semi-porous moldable foam material that may be configured to draw air into and through filter 304. The clean air then flows along tray 306 and into base 308. A portion of the air in base 308 flows into throttle body outlet 328, through throttle ports 322, and into engine 132. Additionally, a portion of the clean air in base 308 flows toward accumulator outlet 310 and into accumulator space 324. The configuration and angle of tray 306 may assist with the flow of air into accumulator space 324. With the increased air volume in airbox 308 and accumulator space 324, the performance of engine 132 may be improved (e.g., the additional air available to throttle body 321 may increase the horsepower of powertrain assembly 130). In this way, it is possible to increase the air available to engine 132 on a vehicle with a wheel base less than 62 inches.

Gases from powertrain assembly 130 are exhausted from vehicle 2 through an exhaust assembly. The exhaust assembly is a dual exhaust system arranged along the right side of vehicle 2. Alternatively, the exhaust assembly may be a single exhaust system comprised of a single exhaust pipe.

Referring to FIGS. 20-23, fuel tank 330 is coupled to front frame 52 and, illustratively, is positioned rearward of head portion 62 and forward of mid-frame 53. Fuel tank 330 is positioned above air intake assembly 300 and frame rails 58. As shown best in FIG. 20, fuel tank 330 has a low profile on front frame 52 and is angled downwardly at a rear end.

Figure 20:
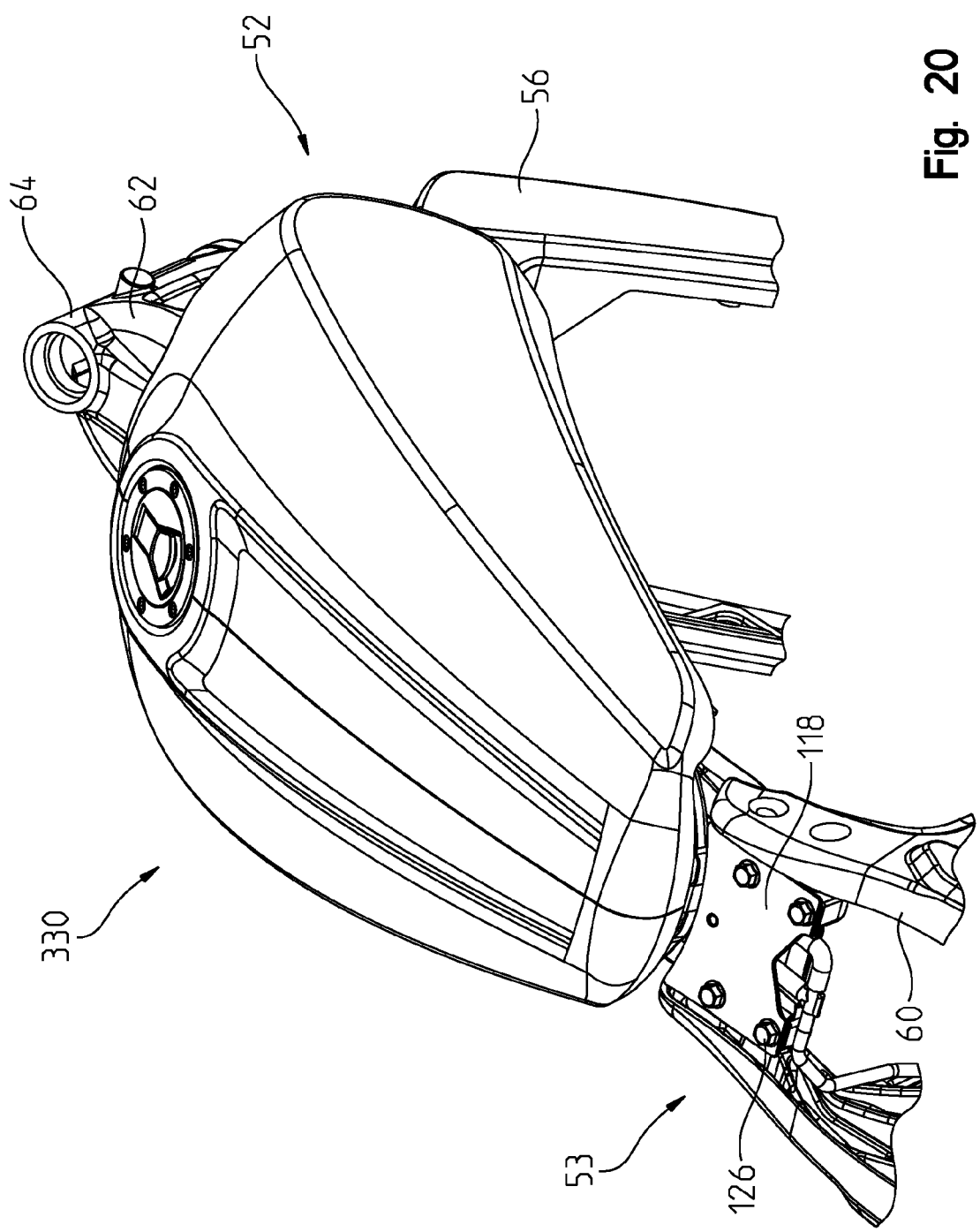
FIG. 20 is a right rear perspective view of a fuel tank of the two-wheeled vehicle of FIG. 1.
Figure 21:
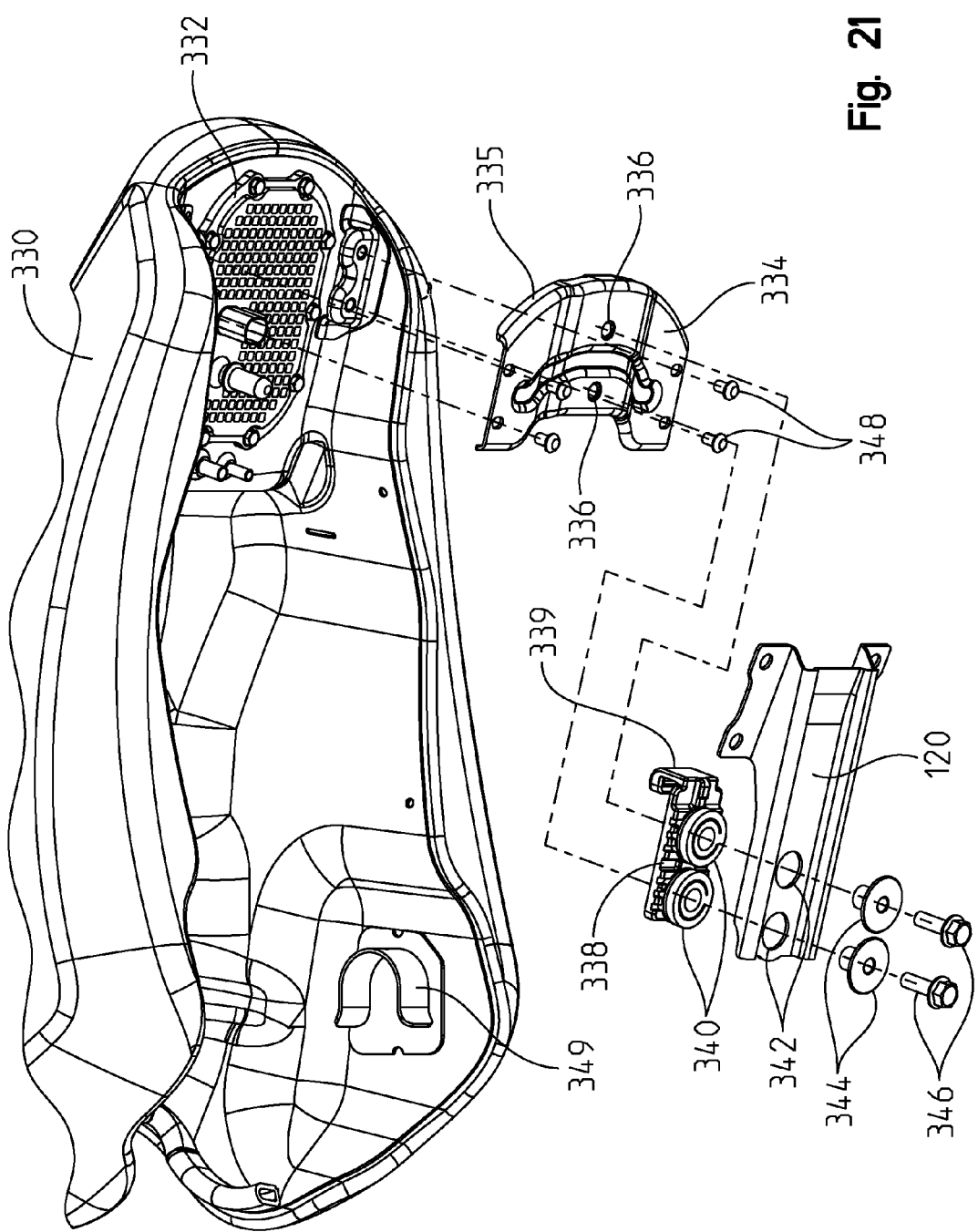
FIG. 21 is an exploded view of the fuel tank of FIG. 20 and a portion of the frame assembly.

As shown in FIG. 21, fuel tank 330 is coupled to a portion of bracket 120 (also shown in FIG. 5). More particularly, a support plate 332 is coupled to the bottom surface of fuel tank 330 at the rear end. In one embodiment, support plate 332 may be comprised of a rigid polymeric material. A bracket 334 includes a lip 335 and a plurality of apertures 336. Fasteners 348 couple bracket 334 to support plate 332 at the rear end of fuel tank 330. Additionally, a coupling member 338 includes a hooking member 339 and a plurality of apertures 340. Apertures 340 of coupling member 338 align with apertures 342 of bracket 120 in order to receive bushings 344 and fasteners 346 therethrough. Fasteners 346 also extend through a portion of bracket 334 in order to secure coupling member 338 and bracket 120 to support plate 332 of fuel tank 330. Additionally, hooking member 339 couples with lip 335 of bracket 334 to further retain coupling member 338 to bracket 334. Illustratively, coupling member 338 is positioned below bracket 334 when assembled together. In this way, fuel tank 330 is coupled to front frame 52 through bracket 120 and is positioned forward of plate 118 (FIG. 20). Bracket 334 and/or coupling member 338 may be comprised of a polymeric material for isolating fuel tank 330 from vibrations.

Additionally, the front end of fuel tank 330 mounts to head portion 62 of front frame 52. More particularly, the underside of fuel tank 330, as shown in FIG. 21, includes a coupler 349 for receiving isolators 88 and posts 86 (FIG. 5) on head portion 62. Isolators 88 are received over posts 86 and are supported on couplers 349. Because isolators 349 are comprised of a polymeric material, isolators 349 may isolate fuel tank 330 from vibrations.

Figure 22:
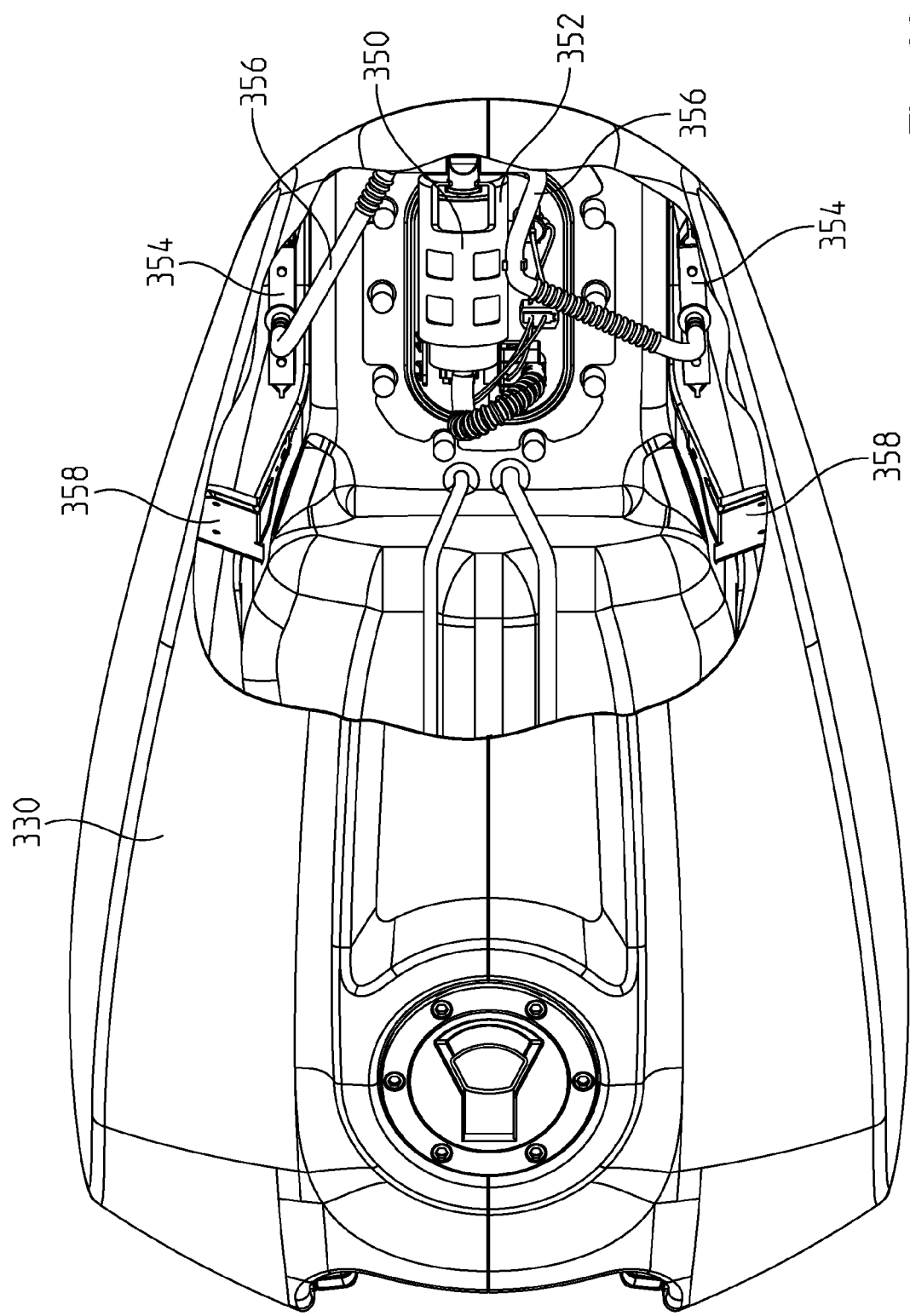
FIG. 22 is a top view of the fuel tank of FIG. 20 with a partial plan view of a fuel pump assembly within the fuel tank.
Figure 23:
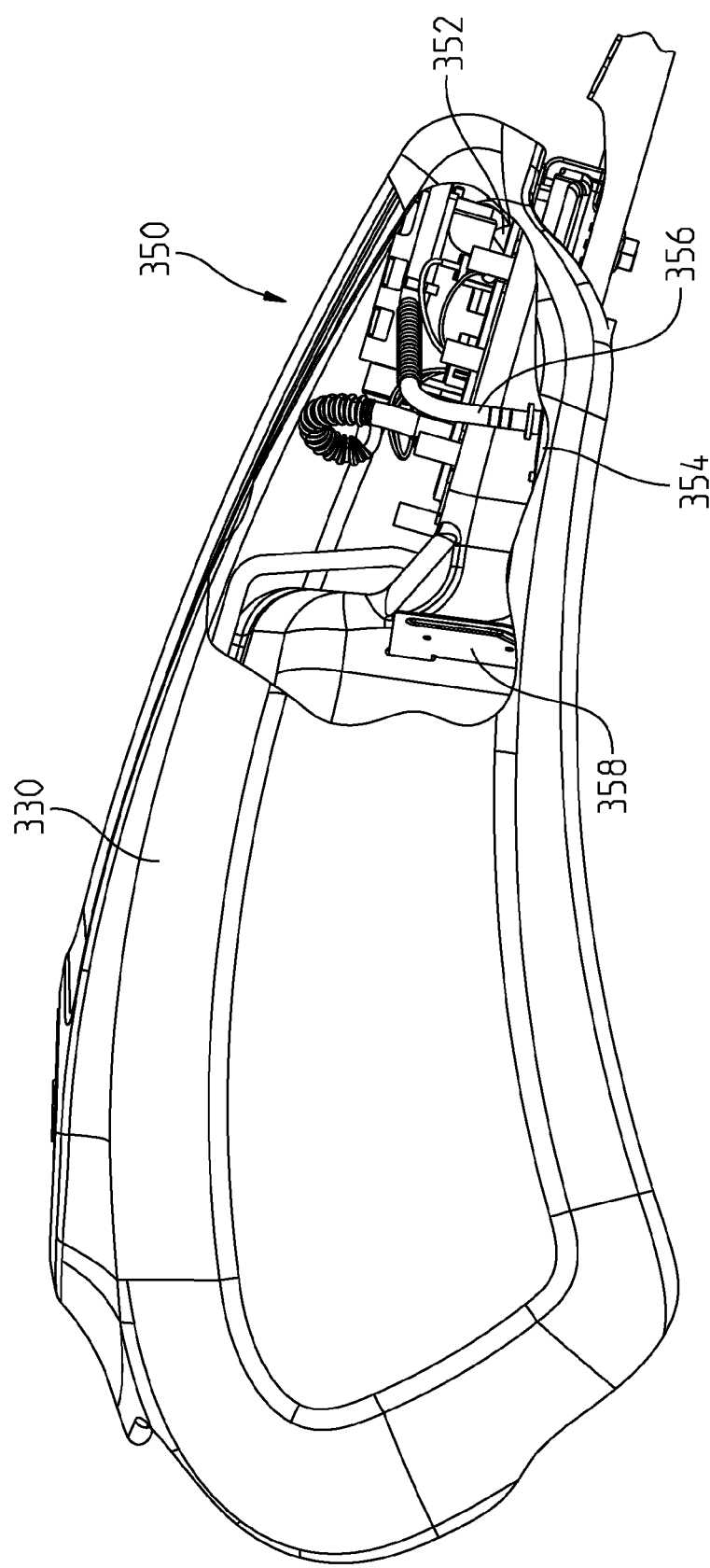
FIG. 23 is a side view of the fuel tank of FIG. 20 with a partial plan view of the fuel pump of FIG. 22.

A fuel pump assembly 350 is supported on support plate 332 at the rear end of fuel tank 330, as shown in FIGS. 22 and 23. Additionally, by positioning fuel pump assembly 250 at the rear of fuel tank 330, the low profile of fuel tank 330 on front frame 52 may be maintained. Fuel pump assembly 350 includes a pump 352 and pick-up filters or screens 354. Screens 354 may be coupled to pump 352 with arms 356. As such, fuel is drawn into pump 352 through screens 354. The fuel is filtered in screens 354 before flowing into pump 352.

The angled configuration of fuel tank 330 allows fuel to flow rearwardly from the front end of fuel tank 330 to the rear end and towards fuel pump 352. However, in order to avoid backsplash as the fuel flows rearwardly, backsplash panels 358 are positioned along the flow path of the fuel within fuel tank 330. Illustratively, backsplash panels 358 are positioned forward of pump 352 and screens 354. As such, backsplash panels 358 generally regulate the flow of fuel within fuel tank 330. Additionally, if vehicle 2 is leaning in a forward direction during operation (e.g., vehicle 2 is positioned downhill), backsplash panels 358 prevent the fuel at the rear end of fuel tank 330 from rapidly flowing forward toward the front end of fuel tank 330. Without backsplash panels 358, fuel pump 352 may be starved of fuel when vehicle 2 is moving downhill.

Figure 24:
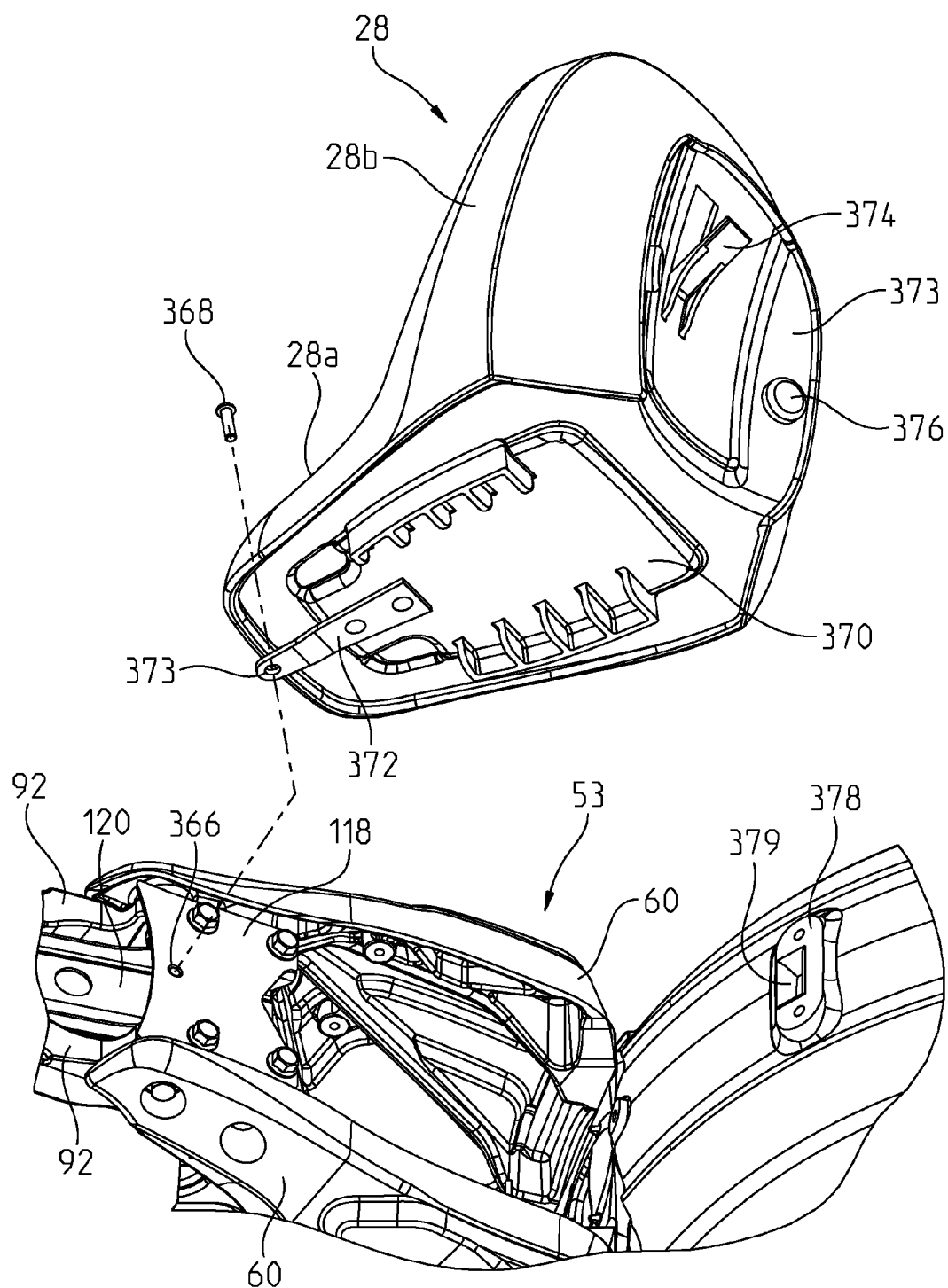
FIG. 24 is an exploded view of a seat and the frame assembly.

As shown in FIG. 24, seat 28 includes a first seat portion 28a and a second seat portion 28b. First and second seat portions 28a, 28b may be integrally coupled together. Alternatively, first and second seat portions 28a, 28b may be separated from each other. First seat portion 28a defines a seat bottom for the operator of vehicle 2. Second seat portion 28b may be configured as a passenger seat bottom or as a back rest portion for the operator. In one embodiment of vehicle 2, second seat portion 28b may be removed such that vehicle 2 includes only first seat portion 28a.

A support plate 370 is positioned below first seat portion 28a and includes a tab 372 having an aperture 373. Aperture 373 is aligned with an aperture 366 in plate 118 and a fastener 368 extends through apertures 373 and 366 in order to couple seat 28 with mid-frame 53. As shown in FIG. 24, seat 28 is supported above side members 60 of mid-frame 53 and is positioned rearward of fuel tank 330 (FIG. 20).

Second seat portion 28b includes a support plate 373 having a latch member 374 and a plurality of rubber bumpers 376. Rubber bumpers 376 are configured to isolate seat 28 from vibrations. Latch member 374 is received within an opening 379 of a plate 378 coupled to rear fender 400. In this way, seat 28 is coupled to mid-frame 53 through plate 118 and is coupled to rear fender 400 with latch member 374.

Referring now to FIGS. 25-28, rear frame 54 is shown. Rear frame 54 is coupled to mid-frame 53 and, more particularly, to side members 60. Rear fender 400 is coupled to rear frame 54 with fasteners 402 and 404. Illustratively, four fasteners 402 and four fasteners 404 couple rear fender 400 to rear frame 54 through apertures 414 on rear fender 400 and apertures 416 on rear frame 54. The shape of rear fender 400 generally corresponds to the shape of rear frame 54. Additionally, the location of seat mounting plate 378 on rear frame 54 maintains the low position of seat 28 and assist in lowering the center of gravity of vehicle 2. Rear frame 54 also may include a guard panel 394 coupled thereto with fasteners 396. Guard panel collects dirt, mud, and other debris that may be spun off of rear wheel 10.

Figure 28:
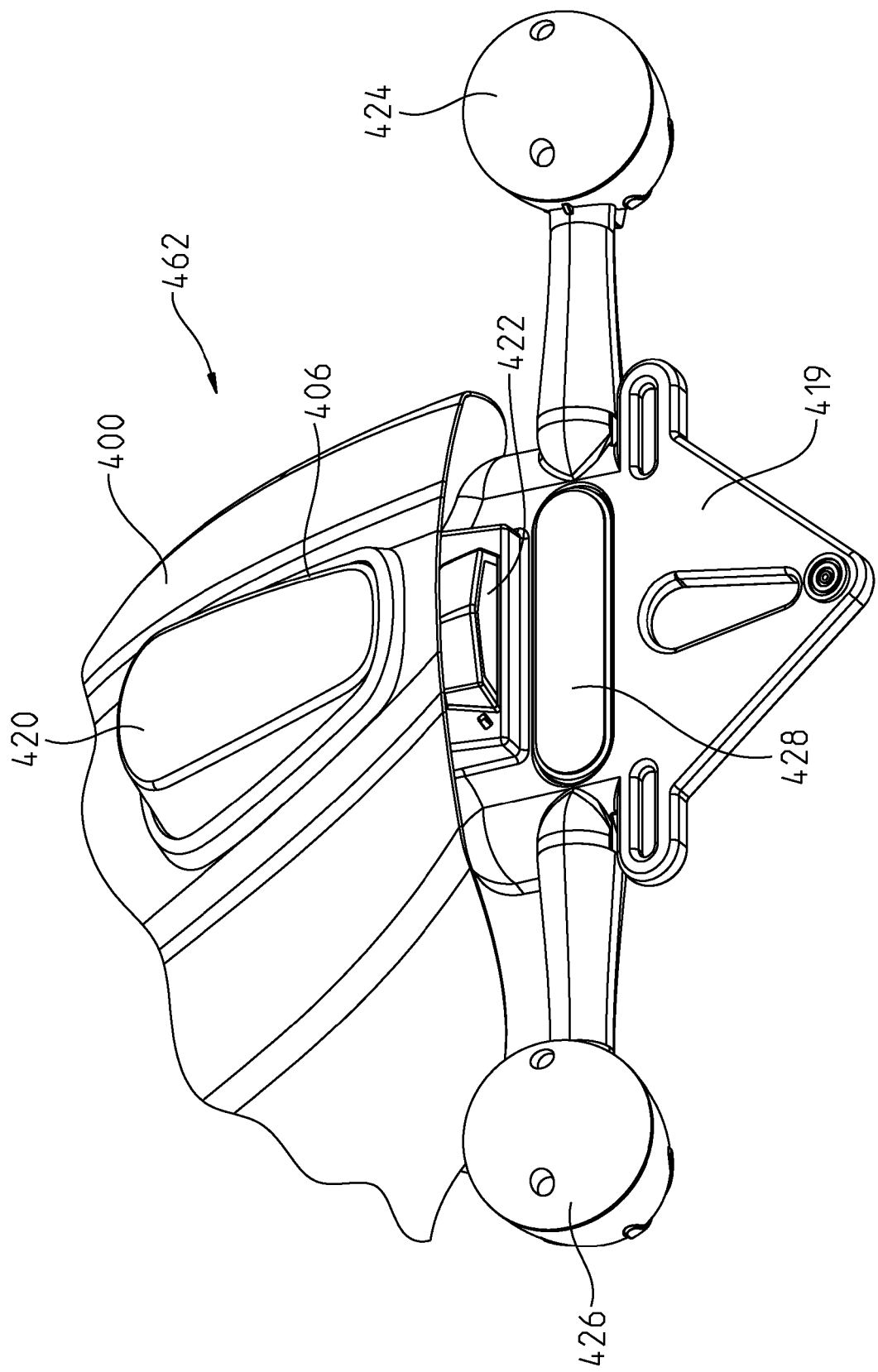
FIG. 28 is a left rear perspective view of the rear fender of FIG. 27 coupled to a rear light assembly.

Rear fender 400 also includes an opening 406 for receiving a rear light assembly 462. As shown in FIG. 28, rear light assembly 462 includes a mounting panel 419 which supports a tail light 420, a right-side turn signal 424, a left-side turn signal 426, a license plate light 422, and a rear reflector 428. Mounting panel 419 and/or tail light 420 also may support a wiring harness for the wires operating tail light 420, turn signals 424 and 426, and license plate light 422. In the illustrative embodiment of FIG. 28, tail light 420 acts as a junction box to support the wiring of tail light 420, turn signals 424 and 426, and license plate light 422. Rear fender 400 also may be configured to support saddlebags or other cargo devices.

Referring now to FIGS. 26 and 27, the front end of illustrative rear fender 400 may not be symmetric. Rather, a right front side 408 of rear fender 400 is longer than a left front side 410. Right front side 408 is configured to contact swing arm 382 and, more particularly, is configured to contact a recess 412 at a front cross-member 460 of swing arms 382. Left front side 410 of rear fender 400 is profiled and includes a notch 411 therein. Recess 412 of cross-member 460 is rearward of a pivot axle 430 of rear suspension assembly 380 and receives right front side 408 of rear fender 400. As such, when vehicle 2 is viewed from the right side, rear fender 400 appears to continuously extend into swing arm 382.

Figure 25:
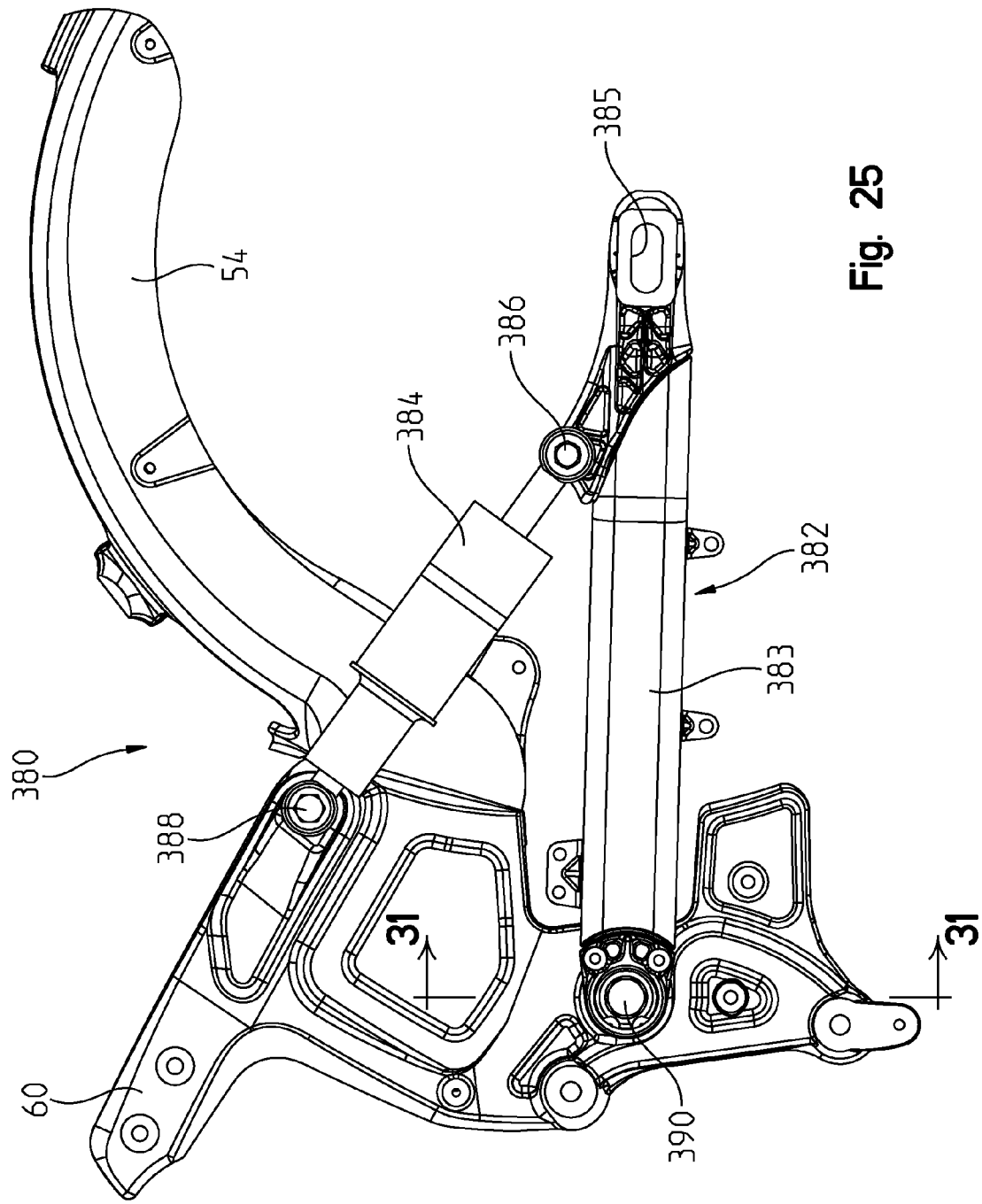
FIG. 25 is a side view of a rear frame of a rear suspension assembly of the two-wheeled vehicle of FIG. 1.
Figure 26A:
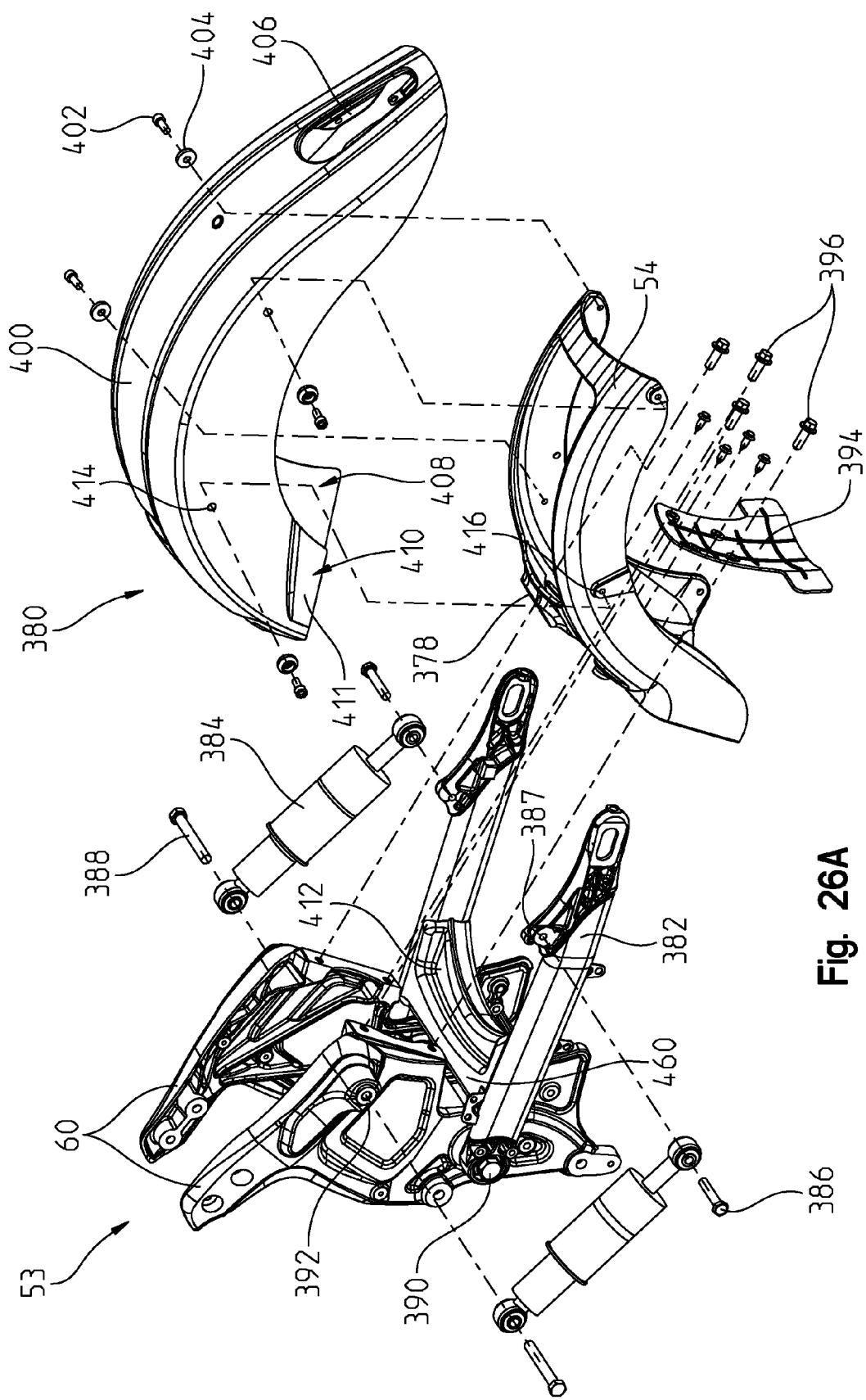
FIG. 26A is an exploded view of a rear portion of the two-wheeled vehicle of FIG. 1.
Figure 26B:
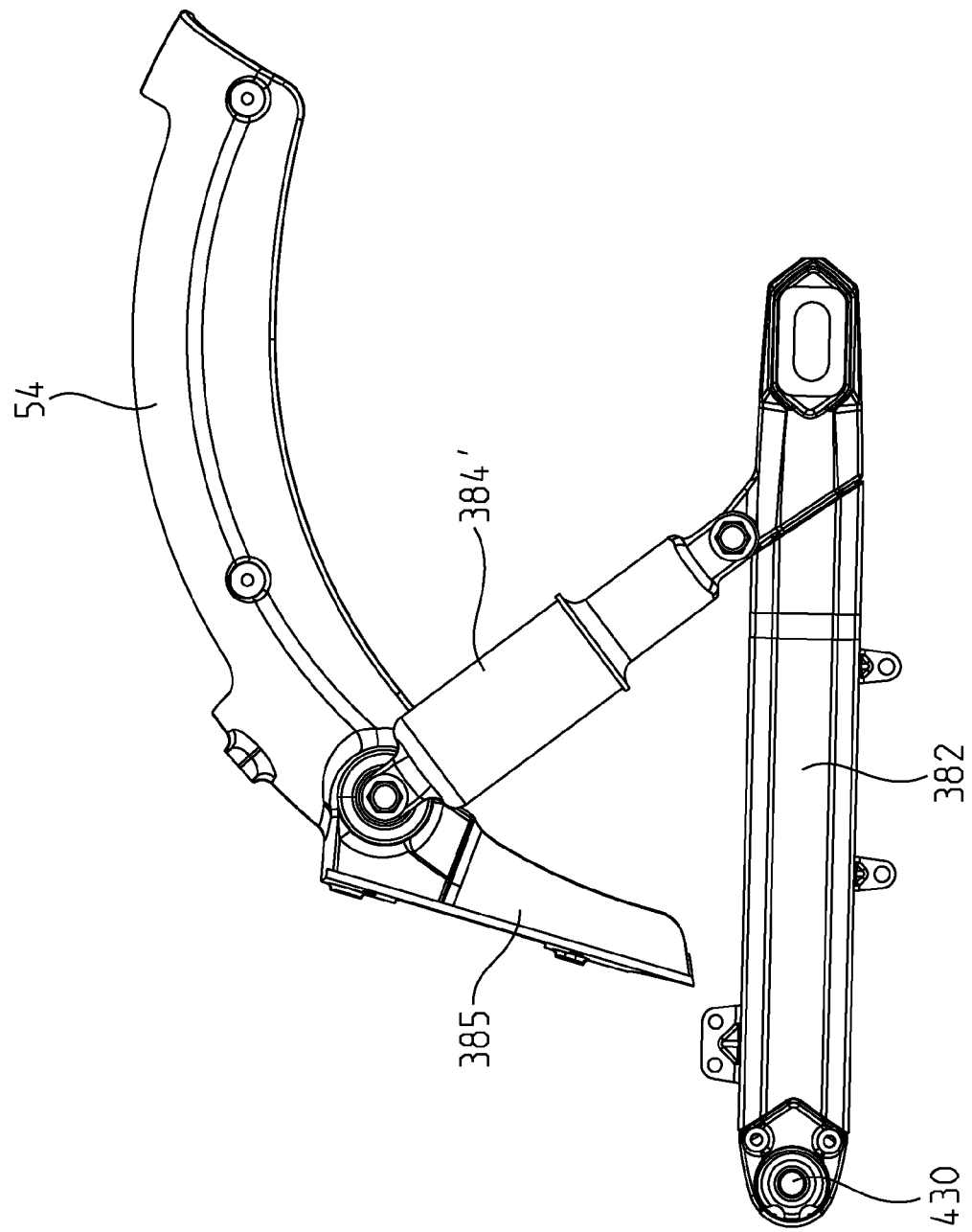
FIG. 26B is a side view of an alternative embodiment of the rear suspension assembly of FIG. 26A.

Rear suspension assembly 380 is coupled to mid-frame 53 and extends partially around rear fender 400. Rear suspension assembly 380 includes a pair of swing arms 382 coupled together through front cross-member 460. Additionally, rear suspension assembly 380 includes a pair of shocks 384 coupled to swing arms 382 and frame assembly 50. More particularly, and as shown in FIG. 26A, an upper end of shocks 384 is coupled to aperture 392 of side members 60 of mid-frame 53 with fasteners 288. Additionally, a lower end of shocks 384 is coupled to apertures 387 on swing arms 382. As shown in FIG. 25, shocks 384 are angled relative to swing arms 384 to give the appearance of a "hard tail," however, shocks 384 are configured to accommodate the suspension load even at this angle. Alternatively, shocks 384' may be coupled to rear frame 54, as shown in FIG. 26B. In one embodiment, a bracket 385 may be used to support shocks 384' on the front end of rear frame 54. As such, the angle of shocks 384', relative to swing arms 382, may be greater than the angle of shocks 384 of FIG. 26A, relative to swing arms 382.

Figure 29:
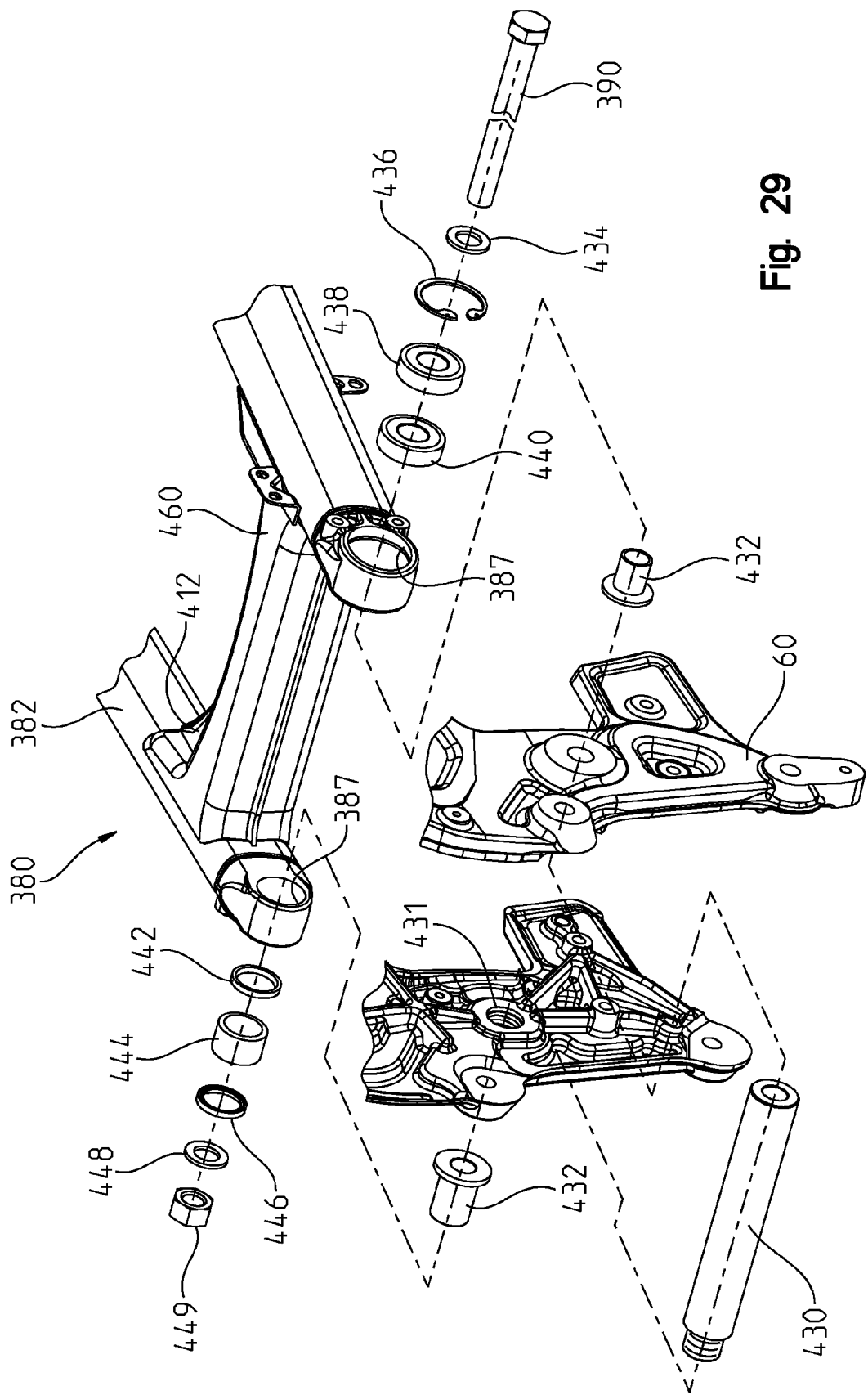
FIG. 29 is an exploded view of a front portion of the rear suspension assembly of FIG. 25.
Figure 30:
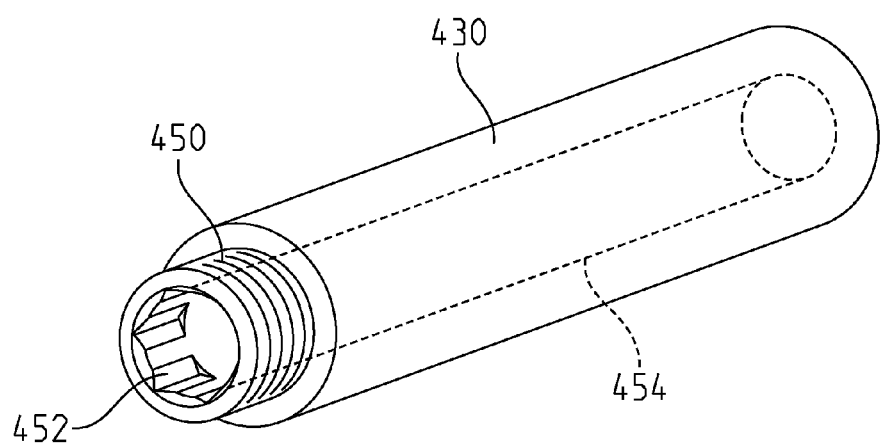
FIG. 30 a right front perspective view of a pivot axle of the rear suspension assembly of FIG. 27.
Figure 31:
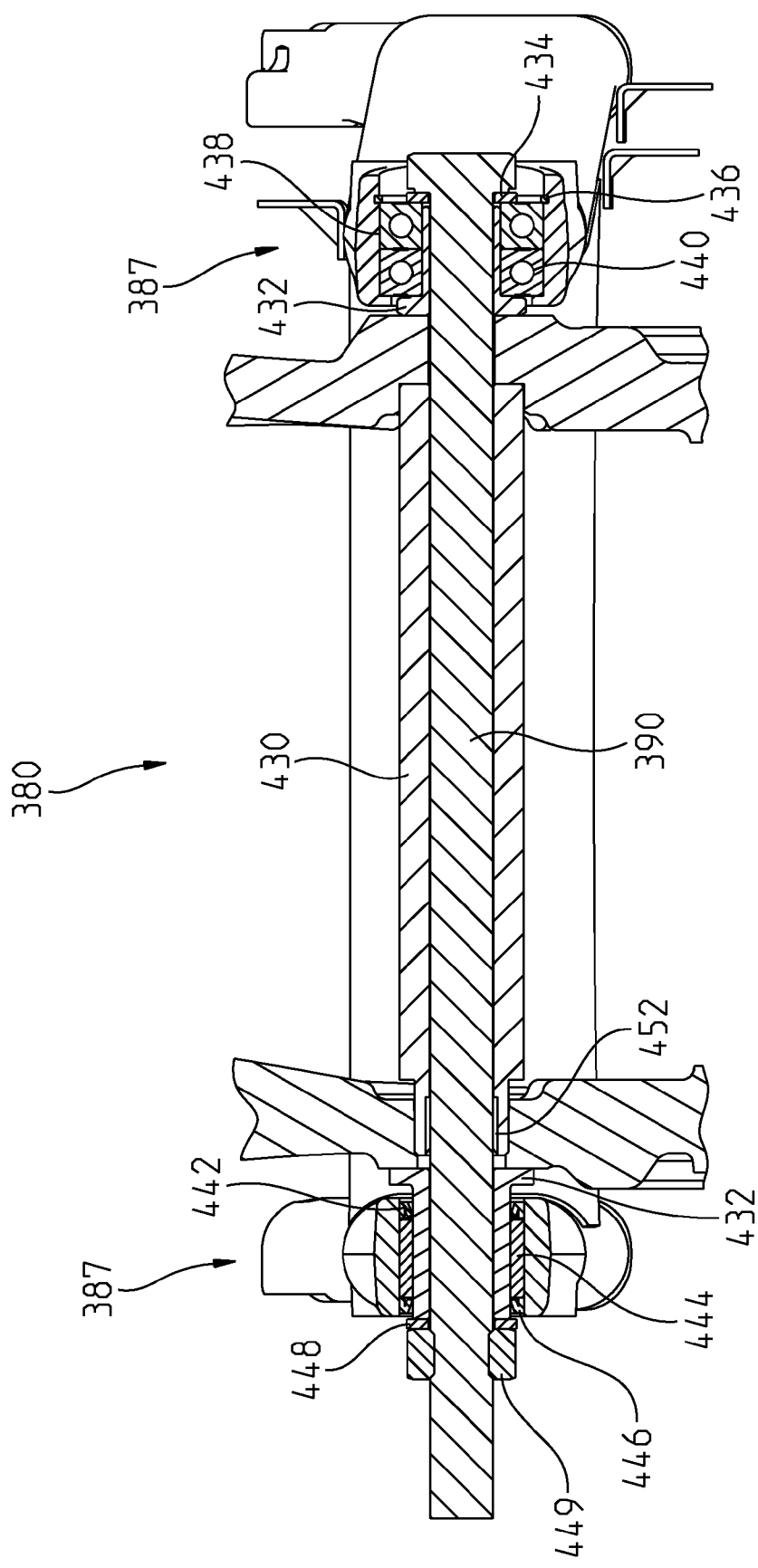
FIG. 31 is a front cross-sectional view of the pivot axle of the rear suspension assembly of FIG. 25, taken along line 31-31 of FIG. 25.

As with shocks 384, swing arms 382 also couple to side members 60 of mid-frame 53. More particularly, the front end of swing arms 382 couple to apertures 391 (FIG. 1) of side members 60. A pivot axle 430 extends between side members 60 and receives a fastener 390 therein. As shown in FIGS. 29-31, the front end of swing arms 382 includes apertures 387 for coupling with pivot axle 430. Additionally, fastener 390, flanged spacers 432, a first washer 434, a clip 436, a first bearing 438, a second bearing 440, a first seal 42, a third bearing 444, a second seal 446, a second washer 448, and a fastener 449 are used to support pivot axle on swing arms 382. As shown in FIG. 30, pivot axle 430 includes a threaded end 450 having an internally profiled surface 452. A cylindrical aperture 454 of pivot axle 430 extends between the outer ends of pivot axle 430.

As shown in FIG. 30, internally profiled surface 452 of pivot axle 430 may be engaged with a tool, for example a wrench, to adjust the spacing between side members 60 when swing arms 382 are coupled thereto. More particularly, the spacing between swing arms 382 is fixed because front cross-member 460 defines the distance therebetween. However, due to the flexibility of frame rails 58, side members 60 may be moved inwardly or outwardly to accommodate the position of swing arms 382. In other words, side members 60 are configured to take up the tolerance between side members 60 and swing arms 382. In operation, as shown in FIG. 29, aperture 391 of side member 60 on the right side of vehicle 2 includes internal threads for engaging with threaded end 450 of pivot axle 430. As such, pivot axle 430 threadedly engages with aperture 391. A tool may be positioned against internally profiled surface 452 to rotate pivot axle 430 further from aperture 391 or to rotate pivot axle 430 outwardly within aperture 391. In this way, the distance between side members 60 accommodates the size and position of swing arms 382.

With the pivot axle 430 in the proper position, fastener 390 may be inserted through cylindrical aperture 454 of pivot axle 430 to couple swing arms 382 to side members 60. As shown in FIG. 31, aperture 387 of the left side swing arm 382 may include washer 434, clip 436, first and second bearings 438, 440, and flanged spacer 432. Illustratively, first and second bearings 438, 440 are ball bearings. Fastener 390 extends through aperture 387 on the left side swing arm 382 and through apertures in washer 434, clip 436, first and second bearings 438, 440, and flanged spacer 432 in order to extend through cylindrical aperture 454 of pivot axle 430. Fastener 390 also extends through aperture 387 on the right side swing arm 382 and through apertures of flanged spacer 432, seal 442, bearing 444, seal 446, washer 448, and is coupled to fastener 449. Illustratively, bearing 444 is a needle bearing and fastener 449 is a nut. In this way, swing arms 382 are coupled to side members 60.

Swing arms 382 are configured to pivot about pivot axle 430 during operation of vehicle 2. Additionally, the arrangement of fastener 390, flanged spacers 432, first washer 434, clip 436, first bearing 438, second bearing 440, first seal 42, third bearing 444, second seal 446, second washer 448, and fastener 449 forms a "float" side on the right side swing arm 382 and a "fixed" side on the left side swing arm 382. More particularly, because bearing 444 is a needle bearing, some limited movement is allowed within aperture 387 and, as such, defines the "float" side. Conversely, bearings 438, 440 are single-row ball bearings which are fixed within aperture 387 and, as such, define the "fixed" side. Under low torque, pivot axle 430 contacts side member 60 on the left side of vehicle 2 because pivot axle 430 is configured to slide to the left along bearing 444.

Figure 32:
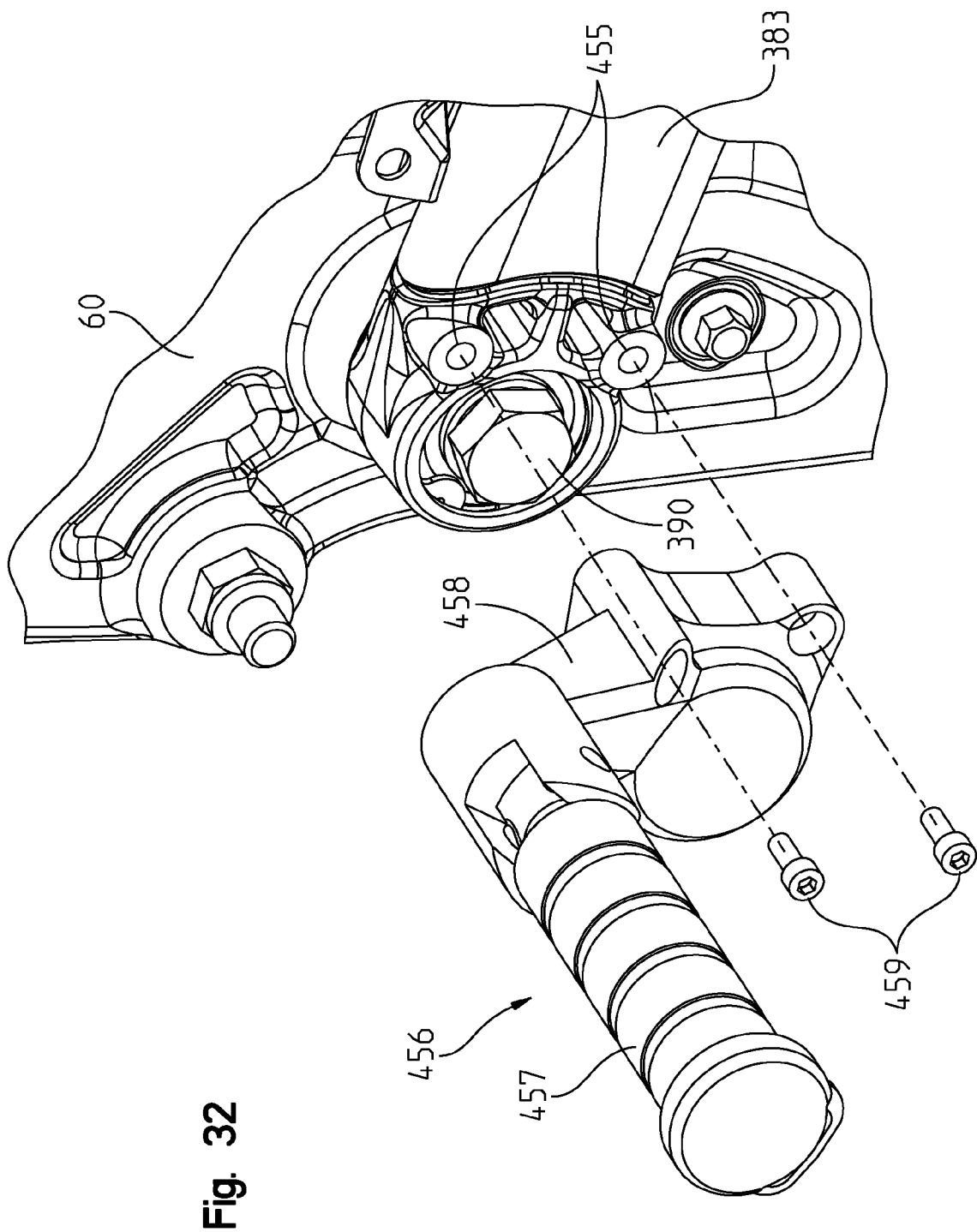
FIG. 32 is an exploded view of a foot peg assembly of the two-wheeled vehicle of FIG. 1.

Referring to FIG. 32, a passenger foot peg assembly 456 includes a foot member 457 and a cover member 458. Foot member 457 is coupled to cover member 458, which is positioned over fastener 390 for swing arms 382. More particularly, fasteners 459 are coupled to apertures 455 on swing arm 382 in order to couple cover member 458 and foot member 457 thereto.

Figure 33:
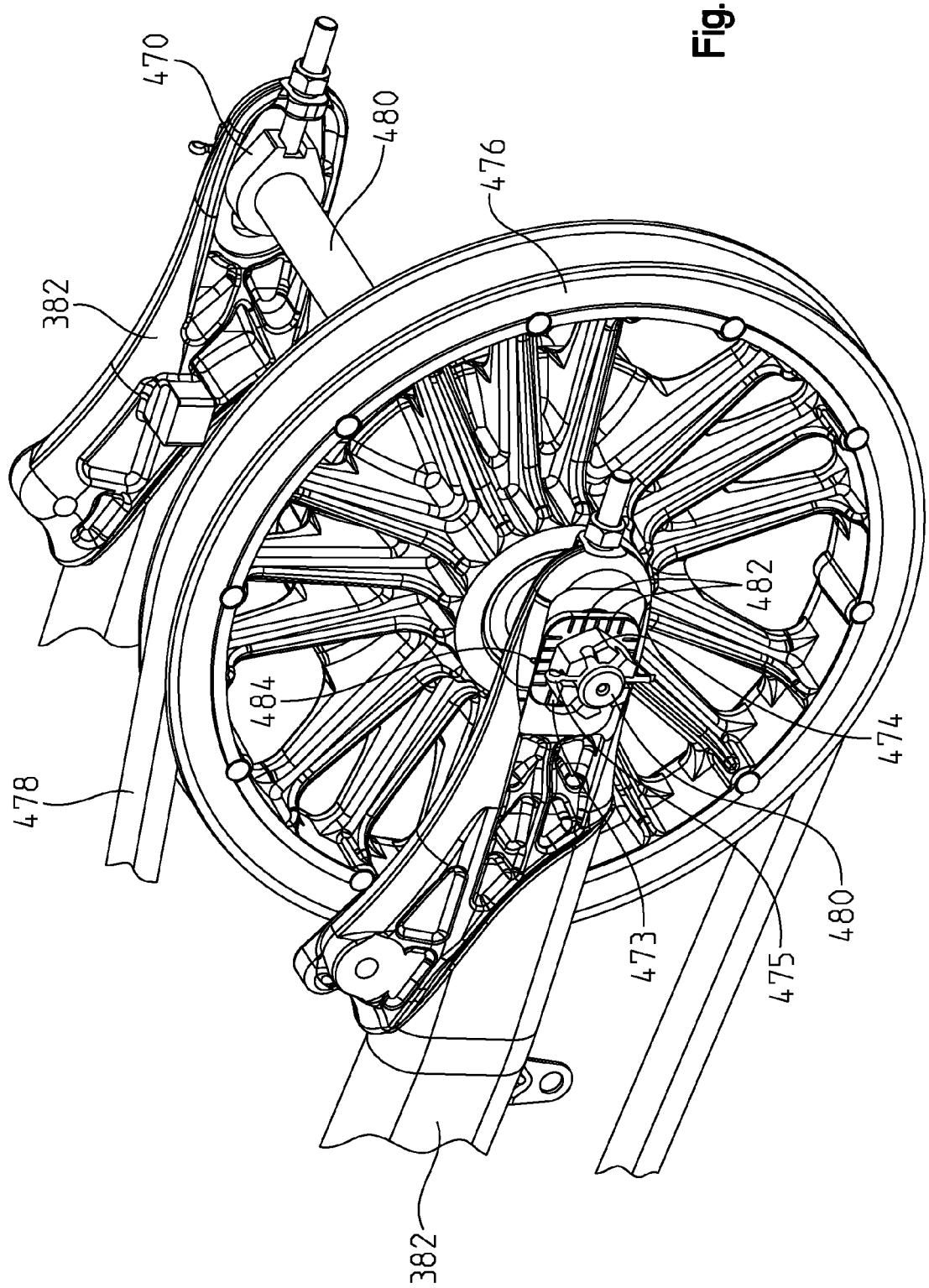
FIG. 33 is a rear left perspective view of a drive wheel and belt coupled to a rear wheel axle of the two-wheeled vehicle of FIG. 1.

As shown in FIG. 33, vehicle 2 includes a belt drive assembly operably coupled to powertrain assembly 130. The belt drive assembly includes a driven wheel 476 and a belt 478. Belt 478 is driven by powertrain assembly 130 and drives wheel 476 in order to rotate a rear axle 480 and rear wheel 10 when operating vehicle 2. As shown in FIG. 33, belt 478 may be sufficiently narrow to fit within a rim of wheel 476. Illustratively, wheel 476 is positioned inward of left side swing arm 382.

Figure 34:
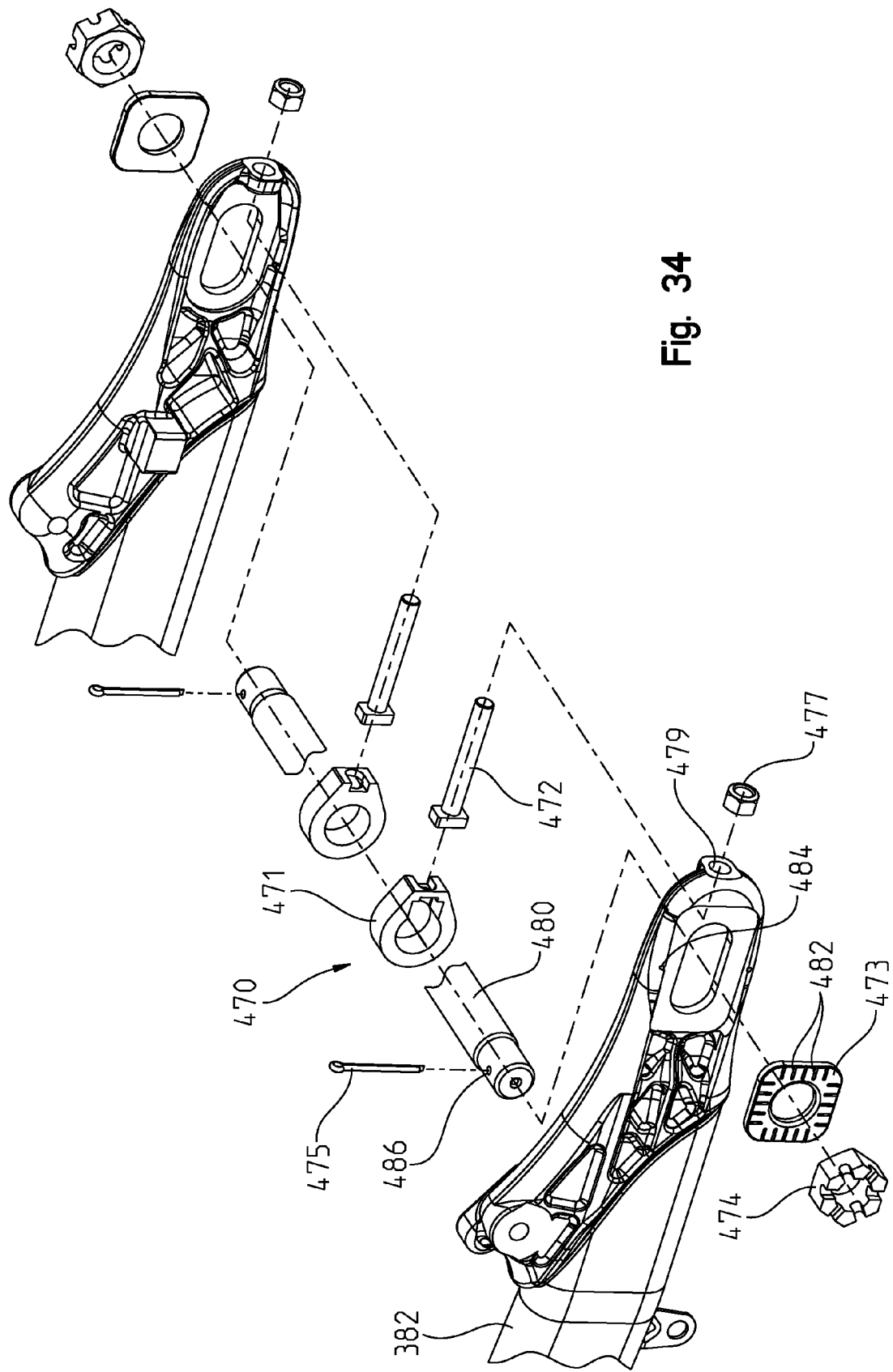
FIG. 34 is an exploded view of the rear axle of FIG. 33.

As shown in FIGS. 33 and 34, a rear axle adjustment member 470 is included on rear axle 480 and couples rear axle 480 with swing arms 382. More particularly, a head 471 of adjustment member 470 is positioned within a rear end of swing arms 382 and a post 472 is coupled to head 471. Post 472 extends through a rear aperture 479 of swing arms 382 and is secured on swing arms 382 with a fastener 477.

An outer end of rear axle 480 extends through an opening in head 471 and is partially outward of swing arm 382. A slotted plate 473 having a plurality of slots 482 is received over rear axle 480 and the appropriate slot 482 is aligned with a slot 484 on swing arm 382. This position of slotted plate 473 is maintained with a nut 474 and a pin 475 that extends through an aperture 486 of rear axle 480. The same slot 482 on the opposing slotted plate 473 on opposing swing arm 382 is aligned with slot 484 on swing arm 382 in order to secure rear axle 480 and rear wheel 10 in proper alignment on swing arms 382.

Figure 35:
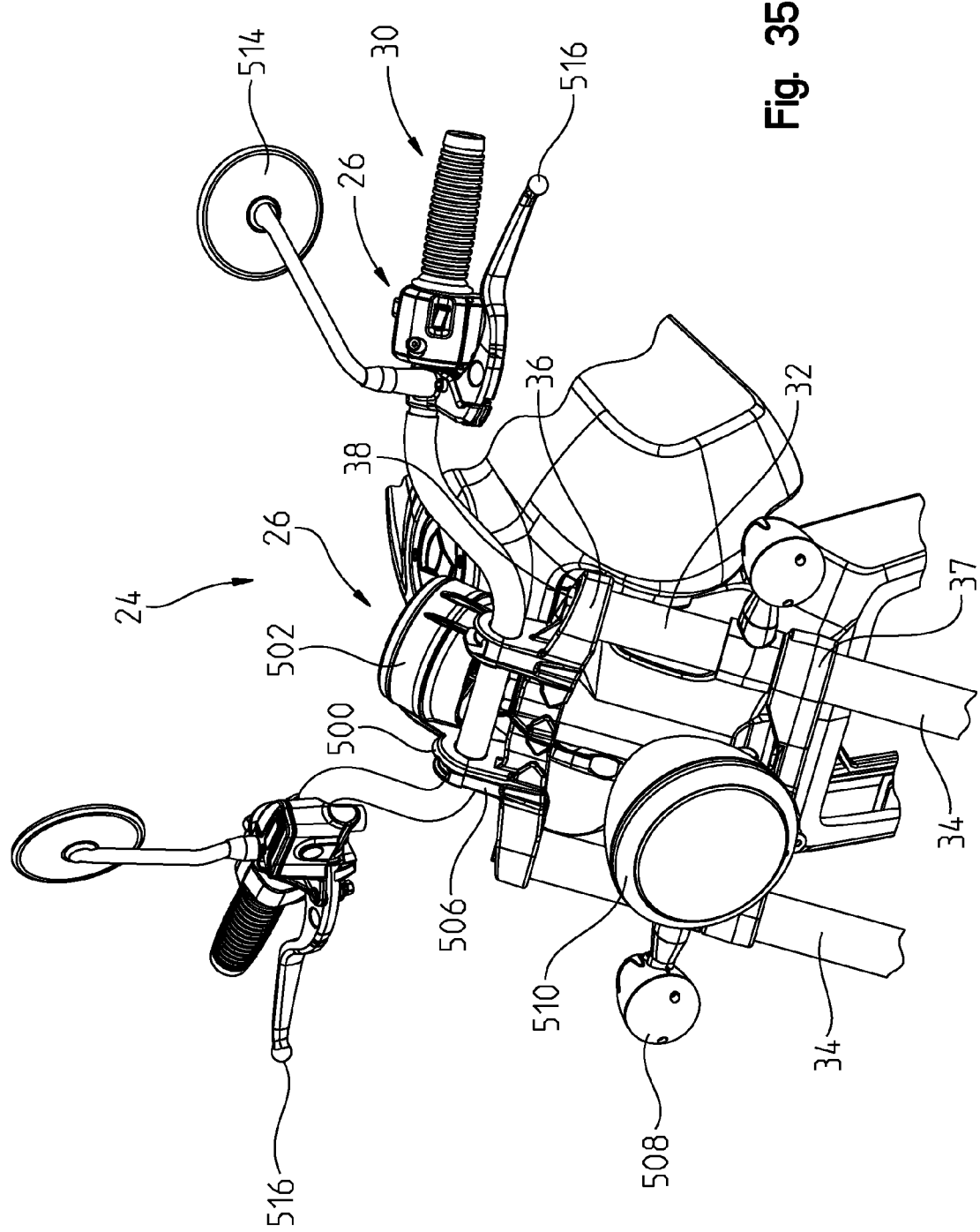
FIG. 35 is a left front perspective view of a front portion of the two-wheeled vehicle of FIG. 1.
Figure 36:
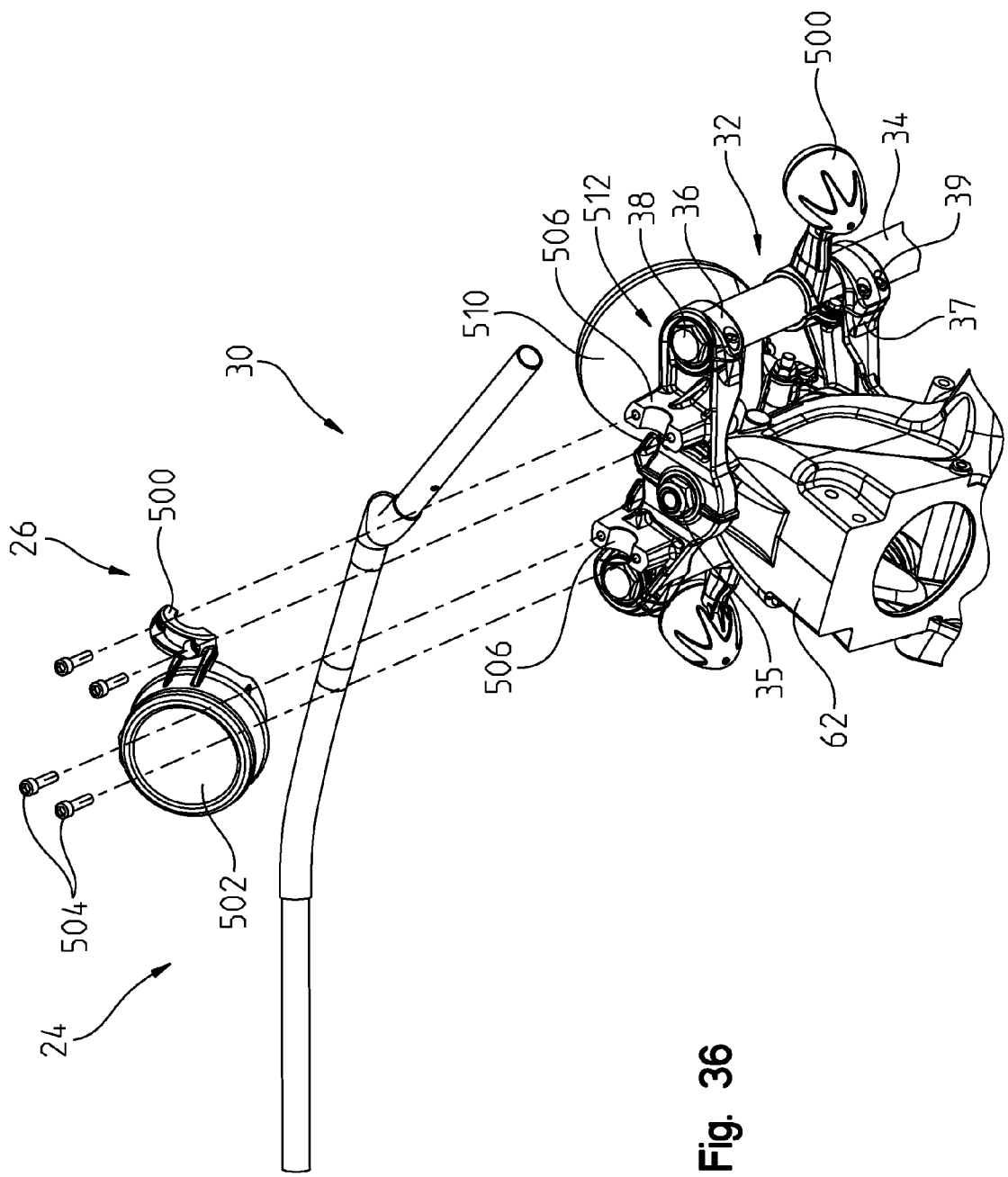
FIG. 36 is a right rear exploded view of the front portion of the two-wheeled vehicle of FIG. 35.

Referring to FIGS. 35 and 36, front end 4 of vehicle 2 includes steering assembly 24, controls 26, and handlebars 30. Handlebars 30 may be mounted on triple clamp assembly 32 with brackets 500, which may be coupled to an operator gauge 502. In this way, a portion of operator gauge 502 may cooperate with triple clamp assembly 32 to mount handlebars 30. Fasteners 504 extend through apertures in brackets 500 and into apertures in support members 506 on an upper portion 36 of triple clamp assembly 32. As such, handlebars 30 are supported on vehicle 2 through triple clamp assembly 32. Upper portion 36 of triple clamp assembly 32 is coupled to head portion 62 with a fastener 35 and is coupled to fork members 34 with fasteners 38. Triple clamp assembly 32 also includes a lower member 37 coupled around forks 24 with apertures 39.

Operator gauge 502 is angled rearwardly toward an operator in seat 28 and may act as a shroud. As such, an additional shroud or cover is not required at front end 4 of vehicle 2. In one embodiment operator gauge 502 is mounted rearwardly of the axis for handlebars 30.

Figure 37:
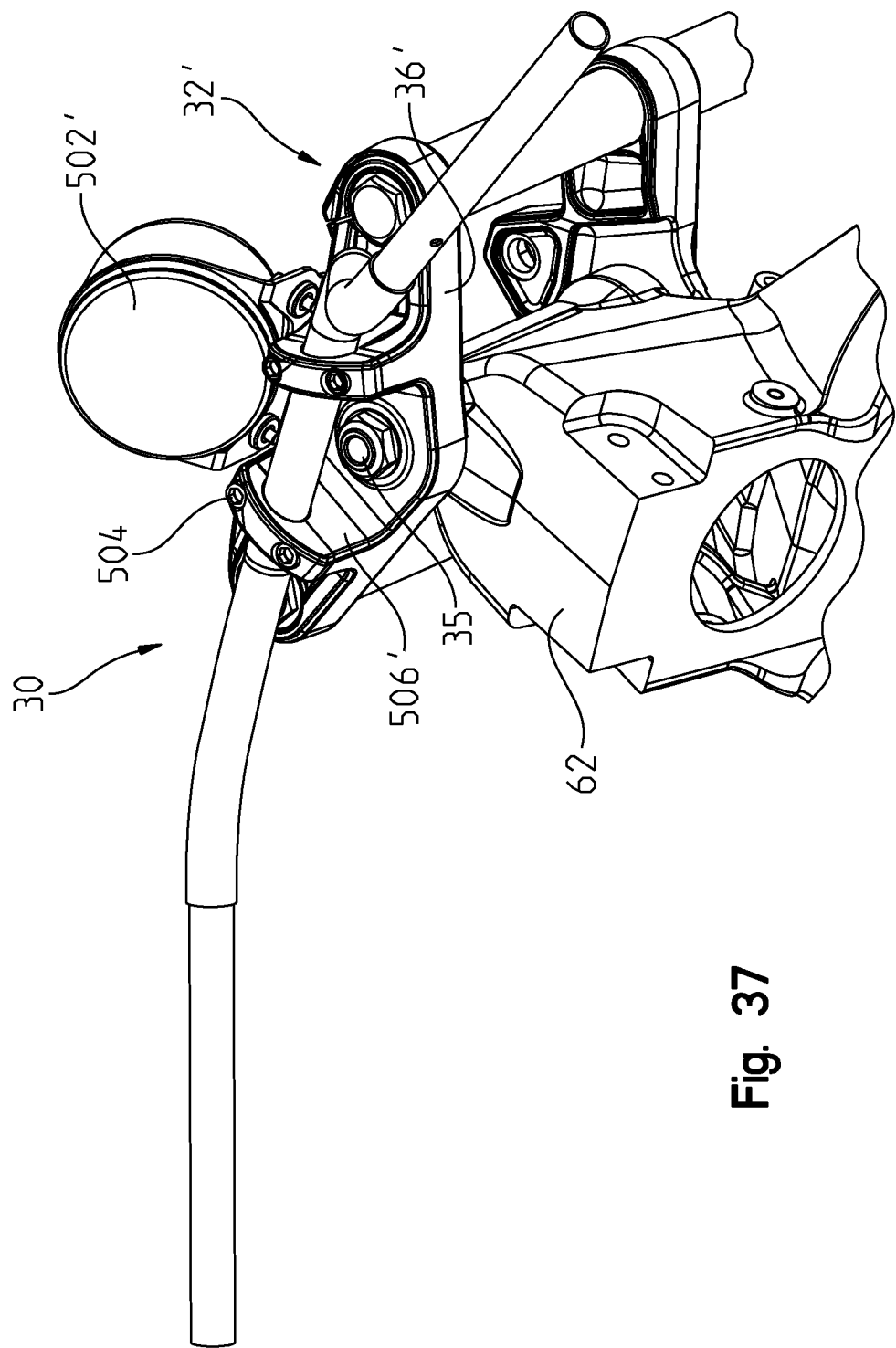
FIG. 37 is a right rear perspective view of an alternative embodiment of the front portion of the two-wheeled vehicle of FIG. 36.

Alternatively, as shown in FIG. 37, handlebars 30' may be coupled to upper portion 36' of triple clamp assembly 32' with brackets 500' and support members 506' However, operator gauge 502' may be positioned forward of the axis of handlebars 30'. In this way, triple clamp assembly 32' may mount handlebars 30' to vehicle 2, however, operator gauge 502' is not integrally supported with handlebars 30'.

Handlebars 30 include mirrors 514 and levers 516. Levers 516 may be throttle and/or brake levers for operating vehicle 2. Additionally, handlebars 30 may include additional operator controls 26. For example, electronic functionality for various aspects, accessories, and components of vehicle 2 may be activated by depressing a button connected to a momentary switch on handlebars 30. In one embodiment, the button is depressed for a predetermined length of time in order to activate the electronic functionality. The ECU is configured to detect the signal outputted by the momentary switch and activate the appropriate functionality. Specific patterns for moving the button would be recognized by ECU through different output signals. In one embodiment, a short push or tap on the button would provide one signal to the ECU, while a depression for a predetermined length of time would output another signal to ECU. The various signals to the ECU trigger the ECU to activate various functionalities of vehicle 2.

Front end 4 of vehicle 2 may also include a headlight 510 and turn signals 508. The wiring for headlight 510 and turn signals 508 may be coupled within a cover or bucket 512 of headlight 510.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A two-wheeled vehicle, comprising:
    a frame assembly including:
        a front frame portion including a head portion, a plurality of generally vertically-extending frame tubes, and a plurality of generally longitudinally-extending frame tubes;
        a mid-frame portion removably coupled to the front frame portion; and
        a rear frame portion removably coupled to the mid-frame portion;
    a plurality of ground-engaging members for supporting the frame assembly; and
    an air intake assembly coupled to the head portion, the longitudinally-extending frame tubes being angled outwardly to increase a distance therebetween, and the air intake assembly being positioned between the longitudinally-extending frame tubes and including channel members configured to removably receive the longitudinally-extending frame tubes, wherein the air intake assembly is frictionally retained between the longitudinally extending frame tubes.

2. The two-wheeled vehicle of claim 1, wherein an upper portion of the air intake assembly is positioned above the longitudinally-extending frame tubes and a lower portion of the air intake assembly is positioned below the longitudinally-extending frame tubes.

3. The two-wheeled vehicle of claim 2, wherein the head portion defines an accumulator volume and is configured to received air from the air intake assembly.

4. The two-wheeled vehicle of claim 3, wherein the air intake assembly includes a filter, and air is configured to flow from the filter into the head portion of the front frame portion.

5. The two-wheeled vehicle of claim 2, further comprising a fuel tank supported by the longitudinally-extending frame tubes.

6. The two-wheeled vehicle of claim 5, wherein the fuel tank is positioned above the air intake assembly.

7. The two-wheeled vehicle of claim 6, further comprising a throttle body, and the air intake assembly is supported on the throttle body.

8. The two-wheeled vehicle of claim 7, wherein the air intake assembly is further frictionally retained between the fuel tank, and the throttle body.

9. The two-wheeled vehicle of claim 1, wherein the longitudinally-extending frame tubes are comprised of steel.

10. The two-wheeled vehicle of claim 1, wherein the front and rear frame portions are cast.

11. The two-wheeled vehicle of claim 1, wherein the channel members are positioned on each lateral side of the air intake assembly and have a shape complementary to a shape of the longitudinally-extending frame members.

12. The two-wheeled vehicle of claim 11, wherein the channel members are U-shaped.

13. A two-wheeled vehicle, comprising:
    a frame assembly including:
        a front frame portion including a head portion, a plurality of generally vertically extending frame tubes, and a plurality of generally longitudinally-extending frame tubes;
        a mid-frame portion removably coupled to the front frame portion; and
        a rear frame portion removably coupled to the mid-frame portion;
    a plurality of ground-engaging members for supporting the frame assembly;
    an air intake assembly coupled to the head portion and including a filter, a first portion of air received into the air intake assembly is directed from the filter of the air intake assembly into the head portion of the front frame portion; and
    a throttle body coupled to the air intake assembly, a second portion of the air received into the air intake assembly flow directly from the filter into the throttle body.

14. The two-wheeled vehicle of claim 13, further comprising a fuel tank, and the air intake assembly is frictionally retained between the longitudinally-extending frame tubes, the fuel tank, and the throttle body.

15. The two-wheeled vehicle of claim 13, wherein the filter is a semi-porous moldable foam.

16. The two-wheeled vehicle of claim 13, wherein the air intake assembly further includes a tray positioned below the filter, and the tray is angled downwardly to direct air from the filter to an accumulator volume defined by the head portion of the front frame portion.

17. A two-wheeled vehicle, comprising:
    a frame assembly including:
        a front frame portion including a head portion, a plurality of generally vertically-extending frame tubes, and a plurality of generally longitudinally-extending frame tubes, wherein the head portion defines an accumulator volume and is configured to received air from an air intake assembly;
        a mid-frame portion removably coupled to the front frame portion; and
        a rear frame portion removably coupled to the mid-frame portion;
    a plurality of ground-engaging members for supporting the frame assembly; and
    the air intake assembly coupled to the head portion and the longitudinally-extending frame tubes, the longitudinally-extending frame tubes being angled outwardly to increase a distance therebetween, and the air intake assembly being positioned between the longitudinally-extending frame tubes and including channel members configured to receive the longitudinally-extending frame tubes.

18. The two-wheeled vehicle of claim 17, wherein an upper portion of the air intake assembly is positioned above the longitudinally-extending frame tubes and a lower portion of the air intake assembly is positioned below the longitudinally-extending frame tubes.

19. The two-wheeled vehicle of claim 17, wherein the air intake assembly includes a filter, and air is configured to flow from the filter into the head portion of the front frame portion.

20. The two-wheeled vehicle of claim 17, further comprising:
   a fuel tank supported by the longitudinally-extending frame tubes; and
   a throttle body, wherein the air intake assembly is supported on the throttle body.

21. The two-wheeled vehicle of claim 20, wherein the air intake assembly is frictionally retained between the longitudinally-extending frame tubes, the fuel tank, and the throttle body.

22. The two-wheeled vehicle of claim 17, wherein the front and rear frame portions are cast.

* * * * *